US010856394B2

(12) United States Patent
Arora et al.

(10) Patent No.: US 10,856,394 B2
(45) Date of Patent: Dec. 1, 2020

(54) CONFIGURING A LOAD CONTROL SYSTEM

(71) Applicant: Lutron Electronics Co., Inc., Coopersburg, PA (US)

(72) Inventors: Ritika Arora, Allentown, PA (US); Manisha Dahiya Baluja, Lansdale, PA (US); John N. Callen, Center Valley, PA (US); Erica L. Clymer, Northampton, PA (US); Sanjeev Kumar, Harleysville, PA (US); Mark Law, Bethlehem, PA (US); Sandeep Mudabail Raghuram, Emmaus, PA (US); Anurag Singh, Allentown, PA (US); Christopher Spencer, Coopersburg, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 421 days.

(21) Appl. No.: 15/424,346

(22) Filed: Feb. 3, 2017

(65) Prior Publication Data

US 2017/0228110 A1    Aug. 10, 2017

Related U.S. Application Data

(60) Provisional application No. 62/291,348, filed on Feb. 4, 2016, provisional application No. 62/347,318, filed on Jun. 8, 2016.

(51) Int. Cl.
*H05B 47/175* (2020.01)
*G06F 3/0481* (2013.01)
(Continued)

(52) U.S. Cl.
CPC .......... *H05B 47/175* (2020.01); *G05B 15/02* (2013.01); *G05B 19/0426* (2013.01); *G06F 3/04817* (2013.01); *G05B 2219/2642* (2013.01)

(58) Field of Classification Search
CPC ... H04L 41/12; H04L 41/145; H04L 12/2807; H04L 41/0873; G06F 3/0484;
(Continued)

(56) References Cited

U.S. PATENT DOCUMENTS 5,021,976 A    6/1991  Wexelblat et al.
D387,044 S    12/1997  Yamamoto et al.
(Continued)

OTHER PUBLICATIONS

Lutron Electronics Co., Inc., What's New Spring 2014, May 2014, Coopersburg PA, 24 pages.

*Primary Examiner* — Andrew L Tank
(74) *Attorney, Agent, or Firm* — Glen Farbanish; Philip Smith; Amy Yanek

(57) ABSTRACT

A load control system may be configured using a graphical user interface software. The graphical user interface software may display a first icon and a second icon. The first icon may represent a first electrical device and the second icon may represent a second electrical device. The first icon and the second icon may represent the relative location of the first electrical device and the second electrical device within a load control environment. The graphical user interface software may display a line from a selected icon (e.g., first icon) to a cursor. The graphical user interface software may adjust the line from the selected icon, for example, as the cursor moves. The graphical user interface software may define and store an association between the first electrical device and a second electrical device, for example, in response to the user selecting the first icon and the second icon.

24 Claims, 39 Drawing Sheets

(51) Int. Cl.
*G05B 15/02* (2006.01)
*G05B 19/042* (2006.01)

(58) Field of Classification Search
CPC ............. G06F 3/04842; G06F 17/5009; G06F 3/04817; G01R 31/2848; G05B 15/02; G05B 19/426; G05B 2219/2642; H02J 2003/007; H02J 3/005; Y04S 40/16; H05B 47/175
See application file for complete search history.

(56) References Cited

U.S. PATENT DOCUMENTS

| | | | |
|---|---|---|---|
| D387,049 S | 12/1997 | Fumarolo et al. | |
| 5,831,610 A * | 11/1998 | Tonelli | H04L 41/12 715/735 |
| 6,839,747 B1 * | 1/2005 | Blumenau | G06F 9/468 709/223 |
| 6,909,921 B1 * | 6/2005 | Bilger | G05B 15/02 700/14 |
| 7,475,351 B1 * | 1/2009 | Johnson | H04L 41/0873 715/736 |
| D598,931 S | 8/2009 | Ogura et al. | |
| D658,204 S | 4/2012 | Jones | |
| 8,336,024 B2 | 12/2012 | Kannan et al. | |
| D697,837 S | 1/2014 | Kirn | |
| D708,193 S | 7/2014 | Agnew et al. | |
| D709,901 S | 7/2014 | Landis et al. | |
| 8,904,302 B2 * | 12/2014 | Higgins | G06F 8/33 715/769 |
| D727,345 S | 4/2015 | Ray et al. | |
| D733,168 S | 6/2015 | Kopetshy et al. | |
| D735,696 S | 8/2015 | Sirpal et al. | |
| D737,316 S | 8/2015 | Li et al. | |
| 9,120,016 B2 | 9/2015 | Epstein | |
| D741,360 S | 10/2015 | Connolly et al. | |
| D743,977 S | 11/2015 | dela Cruz et al. | |
| 9,189,144 B2 * | 11/2015 | Maunder | G06F 3/0488 |
| D759,063 S | 6/2016 | Chen | |
| D759,076 S | 6/2016 | Bain | |
| D760,272 S | 6/2016 | Li | |
| 9,377,921 B2 * | 6/2016 | Huliyar | G06F 3/048 |
| D766,961 S | 9/2016 | Choi et al. | |
| D766,965 S | 9/2016 | Capela et al. | |
| D767,585 S | 9/2016 | Qu | |
| D768,188 S | 10/2016 | Li et al. | |
| D769,314 S | 10/2016 | Piroddi et al. | |
| D774,541 S | 12/2016 | Miao et al. | |
| D785,043 S | 4/2017 | Montgomery | |
| D786,280 S | 5/2017 | Ma | |
| D786,921 S | 5/2017 | Akana et al. | |
| 9,697,304 B1 * | 7/2017 | Wendlandt | G06F 17/5009 |
| D797,129 S | 9/2017 | Danielyan et al. | |
| D800,736 S | 10/2017 | Herman et al. | |
| D800,763 S | 10/2017 | Arora et al. | |
| D801,370 S | 10/2017 | Chawla et al. | |
| D805,535 S | 12/2017 | Danielyan et al. | |
| D812,634 S | 3/2018 | Tuthill et al. | |
| 10,331,828 B2 * | 6/2019 | Nasle | G01R 31/2848 |
| 2003/0078704 A1 | 4/2003 | Partel | |
| 2006/0028212 A1 | 2/2006 | Steiner et al. | |
| 2009/0276724 A1 | 11/2009 | Rosenthal et al. | |
| 2010/0153848 A1 | 6/2010 | Saha | |
| 2014/0354650 A1 | 12/2014 | Singh et al. | |
| 2015/0242106 A1 | 8/2015 | Penha et al. | |
| 2015/0319046 A1 * | 11/2015 | Plummer | H04L 12/2807 715/736 |
| 2015/0331551 A1 | 11/2015 | Lee et al. | |
| 2016/0004759 A1 | 1/2016 | Ramakrishnan et al. | |
| 2016/0027278 A1 * | 1/2016 | McIntosh | G08B 21/0423 715/741 |
| 2016/0034149 A1 | 2/2016 | Kang et al. | |
| 2016/0259901 A1 | 9/2016 | Seward | |
| 2016/0357712 A1 | 12/2016 | Zoon et al. | |
| 2016/0357842 A1 | 12/2016 | Kohlmeier et al. | |
| 2016/0364248 A1 | 12/2016 | Zimmerman | |

* cited by examiner

CONFIGURING A LOAD CONTROL SYSTEM

CROSS-REFERENCE TO RELATED APPLICATIONS

This application claims the benefit of U.S. Provisional Patent Application No. 62/291,348, filed Feb. 4, 2016, and U.S. Provisional Patent Application No. 62/347,318, filed Jun. 8, 2016, the entire disclosures of which are incorporated by reference herein.

BACKGROUND

A load control environment, such as a residence or an office building, for example, may be configured with various types of load control systems. The load control environment may include load control devices that are associated with input devices for communicating load control instructions for controlling an electrical load. The load control environment may include one or more rooms. Each of the rooms includes load control devices that are capable of directly controlling an electrical load. For example, each of the rooms may include lighting control devices (e.g., ballasts, LED drivers, or dimmer switches) capable of directly controlling an amount of power provided to lighting loads. A room may include additional load control devices, such as a motorized window treatments and/or an HVAC system.

Each load control system may include various input devices and load control devices. The input devices may be capable of controlling the electrical load via the load control device by sending digital messages to the load control device that include control instructions for controlling the electrical load controlled by the load control device. To enable a load control device to recognize instructions received from an input device, the load control device and the input device may be associated with one another, such that the load control device may recognize the digital messages received from the input device.

In an association procedure, input devices and load control devices are associated by a user. The user may associate input devices and load control devices by creating an association table. The association table includes a table that associates each load control device with input devices on a computer. The association table, however, lacks spatial information of the input devices and the load control devices. For example, the association table may include information of a general location of an input device (e.g., conference room, bedroom, etc.) or the association table may include information of a location of a load control device (e.g., conference room, bedroom, etc.). The association table, however, does not include other information relevant to the installation and setup of the devices in the load control system. For example, information of the location of the input device as it relates to the load control device, or vice-versa, may be unknown. The compatibility of devices within the system, and how they may be wired during installation or grouped after installation, may also be unknown.

When further configuring the load control system, various occupancy sensors may be selected for installation. Configuring the load control system with the proper occupancy sensor may be difficult without an understanding of the relative location of the occupancy sensor within the load control environment and the specific occupancy sensor being installed, as each occupancy sensor may be configured to sense different types of movement at different ranges using different types of technology.

SUMMARY

A load control system may include control devices for controlling an amount of power provided to an electrical load. The load control system may include one or more system controllers. The control devices may include control-source devices and/or control-target devices. The control-target devices may be load control devices capable of controlling the amount of power provided to a respective electrical load based on digital messages received from the control-source devices. The digital messages may include load control instructions or another indication that causes the control-target device to determine load control instructions for controlling an electrical load.

One or more system controllers may communicate with control devices. For example, system controllers may communicate with control devices for configuring control devices, associating control devices, providing scenes (e.g., presets) via one or more control devices, etc. System controllers may communicate with control devices for operating control devices. For example, system controllers may communicate with control devices by generating instructions for control devices, sending instructions to control devices, and/or receiving instructions from control devices. System controllers may communicate with control devices by sending digital messages to the control devices wirelessly (e.g., via a proprietary communication channel, such as CLEAR CONNECT™, etc.).

As described herein, control-target devices and control-source devices may be associated with each to allow for communication between the devices. A system controller may be used to perform the associations between the control-target devices and the control-source devices. For example, a system controller may be used to send digital messages to control-source devices for associating with control-target devices with the control-source source devices, and/or a system controller may be used to send digital messages to control-target devices for associating with control-source devices with the control-target devices. The digital messages may include an identification of the control-source devices and/or an identification of the control-target devices with which the system controllers may communicate. A control-source device may send digital messages to a control-source device for associating the control-target device with the control-source device, and the system controller may receive the digital message and store information regarding the association between the control-target device with the control-source device.

The load control system may be configured using a graphical user interface software. The graphical user interface software may run on a network device, such as a personal computer (PC), a laptop, a tablet, a smart phone, or equivalent device having a visual display. Using the graphical user interface software, a user may select the electrical devices (e.g., the electrical loads and/or the control devices of the load control system, such as control-source devices and/or control target devices). For example, the graphical user interface software may display a first icon and a second icon. The first icon may represent a first electrical device and the second icon may represent a second electrical device. The graphical user interface software may display a line from a selected icon (e.g., first icon). For example, the graphical user interface software may display a line from a selected icon (e.g., first icon) to a cursor. The graphical user interface software may adjust the line from the selected icon (e.g., first icon), for example, as the cursor moves. The graphical user interface software may define a relationship (e.g., an electrical connection or an association) between the first electrical device and a second electrical device. For example, the graphical user interface software may define the relationship between the first electrical device with the second electrical device in response to the user selecting the second icon, if allowed by the system limitations. The relationships may be stored in a relationship table or dataset may include a unique identifier of devices in the system and/or the corresponding unique identifier of the relationships of the devices. The relationship information in the relationship table or dataset for a device in the load control system may be uploaded to one or more devices for enabling control of electrical loads and/or communications (e.g., load control communications) between the associated devices.

The graphical user interface software may cease displaying the line extending from the selected first icon to the cursor, for example, after the selection of the second icon. The graphical user interface software may display an identical notation on the first icon and the second icons, for example, after ceasing display of the line extending from the selected first to the cursor. The graphical user interface software may allow for selection of one or more icons, may display lines from one or more selected icons to the cursor, and/or may define a relationship between the one or more electrical devices and a single electrical device in response to the selection of an icon representing the single electrical device.

DETAILED DESCRIPTION

Figure 1:
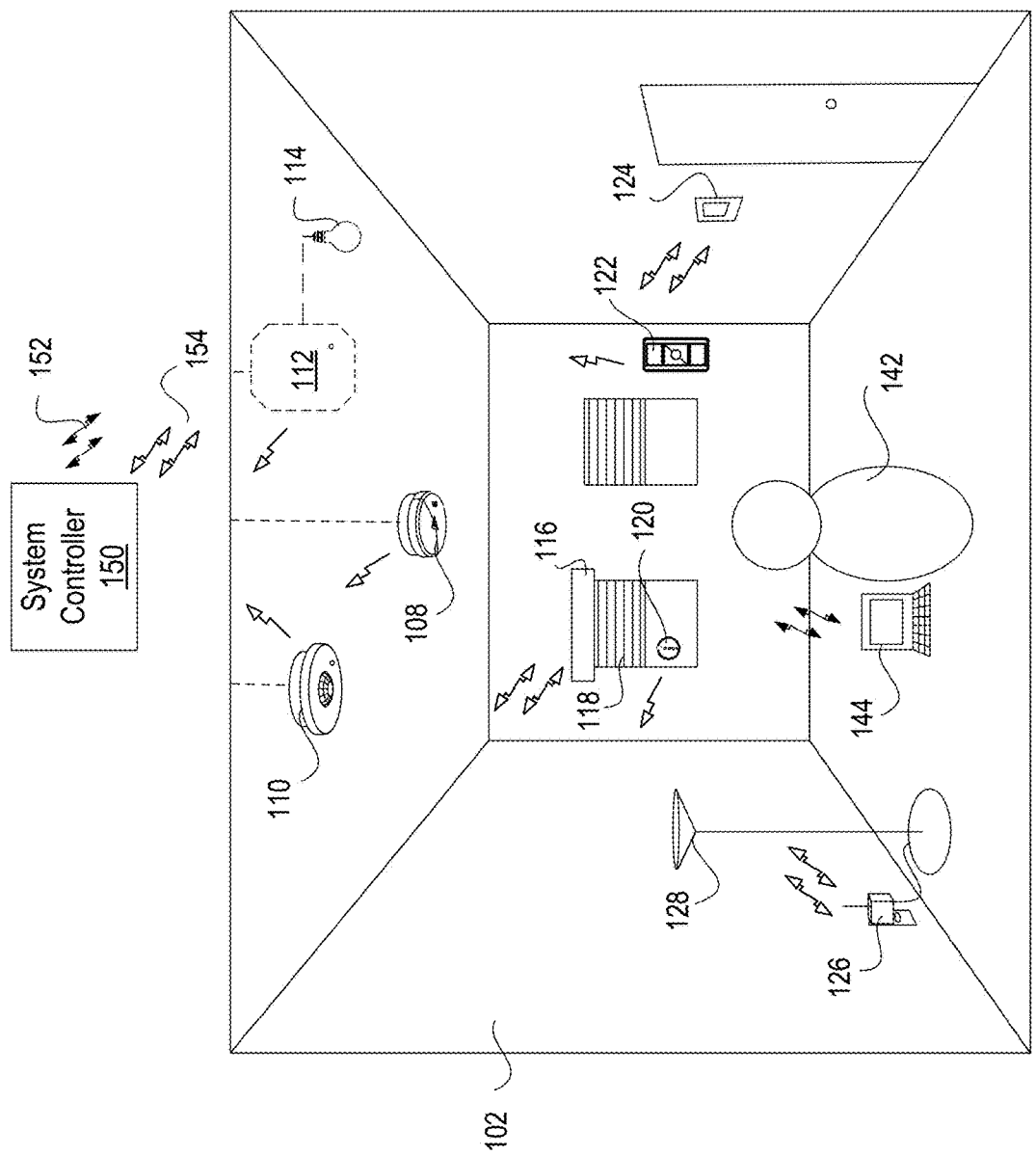
FIG. 1 is a system diagram that illustrates an example load control environment for associating control devices and controlling electrical loads.

FIG. 1 depicts a load control environment 102 that includes control-source devices and control-target devices.

As shown in FIG. 1, the load control environment 102 may be a room in a building. The load control environment 102 may include control-target devices that may be capable of controlling (e.g., directly controlling) an electrical load. For example, load control environment 102 may include a lighting control device 112. The lighting control device 112 may be a ballast, a light emitting diode (LED) driver, a dimmer switch, and/or the like. The lighting control device 112 may be capable of directly controlling an amount of power provided to lighting load 114. Load control environment 102 may include one or more control-target devices, such as a motorized window treatment 116 for directly controlling the covering material 118 (e.g., via an electrical motor), a plug-in load control device 126 for directly controlling a floor lamp 128, a desk lamp, and/or other electrical loads that may be plugged into the plug-in load control device 126, and/or a temperature control device 124 (e.g., thermostat), for directly controlling an HVAC system.

The control-source devices in load control environment 102 may include a remote control device 122, an occupancy sensor 110, a daylight sensor 108, and/or a window sensor 120. The control-source devices may send digital messages to associated control-target devices for indirectly controlling an electrical load by transmitting digital messages, such as load control messages, to the control-target devices. The remote control device 122 may send digital messages for controlling a control-target device after actuation of one or more buttons. The occupancy sensor 110 may send digital messages to a control-target device based on an occupancy or vacancy condition (e.g., movement or lack of movement) that is sensed within its observable area. The daylight sensor 108 may send digital messages to a control-target device based on the detection of an amount of light within its observable area. The window sensor 120 may send digital messages to a control-target device based on a measured level of light received from outside of the load control environment 102. For example, the window sensor 120 may detect when sunlight is directly shining into the window sensor 120, is reflected onto the window sensor 120, and/or is blocked by external means, such as clouds or a building. The window sensor 120 may send a digital message indicating the measured light level.

The control-source devices and/or the control-target devices may be in communication with a system controller 150. The system controller 150 may be capable of transmitting digital messages to, and/or receiving digital messages from, control devices (e.g., control-source devices and/or control-target devices). The digital messages may include association information for associating control-source devices and/or control-target devices. The system controller 150 may maintain the association between the control-target device and the control-source device when the system controller is integrated into the load control system. The system controller 150 may maintain the association between devices to enable control of the control-target devices by the associated control-source devices after integration of the system controller 150 into the load control system.

The system controller 150 may facilitate communication of control information from control-source devices to associated control-target devices using the association information. The system controller 150 may be a gateway device, a network bridge device, an access point, and/or the like. Examples of load control systems having system controllers 150 are described in greater detail in commonly-assigned U.S. Patent Application Publication No. 2014/0001977, published Jan. 2, 2014, entitled LOAD CONTROL SYSTEM HAVING INDEPENDENTLY-CONTROLLED UNITS RESPONSIVE TO A BROADCAST CONTROLLER, and U.S. Patent Application Publication No. 2015/0185752, published Jul. 2, 2015, entitled WIRELESS LOAD CONTROL SYSTEM, the entire disclosures of which are hereby incorporated by reference.

The control-source devices in load control environment 102 may be associated with the control-target devices using various association techniques. For example, in an association procedure, the control-source devices may be associated with the control-target devices by the user 142 actuating a button on the control-source device and/or the control-target device. The actuation of the button on the control-source device and/or the control-target device may place the control-source device and/or the control-target device in an association mode, for example, for being associated with one another. In the association mode, the control-source device may transmit an association message to the control-target device. The association message from a control-source device may include a unique identifier of the control-source device. The control-target device may locally store the unique identifier of the control-source, such that the control-target devices may be capable of recognizing digital messages (e.g., subsequent digital messages) from the control-source device that may include load control instructions. The control-target device may be capable of responding to the digital messages from the associated control-source device by controlling a corresponding electrical load according to the load control instructions received in the digital messages. Examples of load control systems are described in greater detail in commonly-assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, and U.S. Pat. No. 8,417,388, issued Apr. 9, 2013, entitled LOAD CONTROL SYSTEM HAVING AN ENERGY SAVINGS MODE, the entire disclosures of which are hereby incorporated by reference.

The load control system may be designed and/or configured using a design software, e.g., a graphical user interface (GUI) software, running on a network device, such as a personal computer (PC) 144, a laptop, a tablet, a smart phone, or equivalent device having a visual display. Using the design software, a user may select the electrical devices (e.g., the electrical loads and/or the control devices of the load control system, such as control-source devices and/or control target devices). The user may generate connections and/or associations between selected electrical devices of the load control system. The connections and/or associations generated by the design software may define the operation of the load control system during normal operation. Examples of configuration procedures for load control systems are described in greater detail in commonly-assigned U.S. Pat. No. 8,228,163, issued Jul. 24, 2012, entitled HANDHELD PROGRAMMER FOR LIGHTING CONTROL SYSTEM, and U.S. Patent Application Publication No. 2014/0265568, published Sep. 18, 2014, entitled COMMISSIONING LOAD CONTROL SYSTEMS, the entire disclosures of which are hereby incorporated by reference.

FIGS. 2-16 illustrate example graphical representations of a user interface that may be displayed on a visual display of a network device by a design software, e.g., a graphical user interface (GUI) software, for designing and configuring a load control system (e.g., a building control system). The design software may display a canvas 200 on which electrical devices (e.g., control devices of the load control system) may be illustrated. A user of the design software may interact with the elements of the software using a cursor 202 (e.g., by manipulating a mouse or other input device to move the cursor). The canvas 200 may display a floorplan (not shown) and the control devices of the load control system may be located at the appropriate locations on the floorplan.

Figure 2:
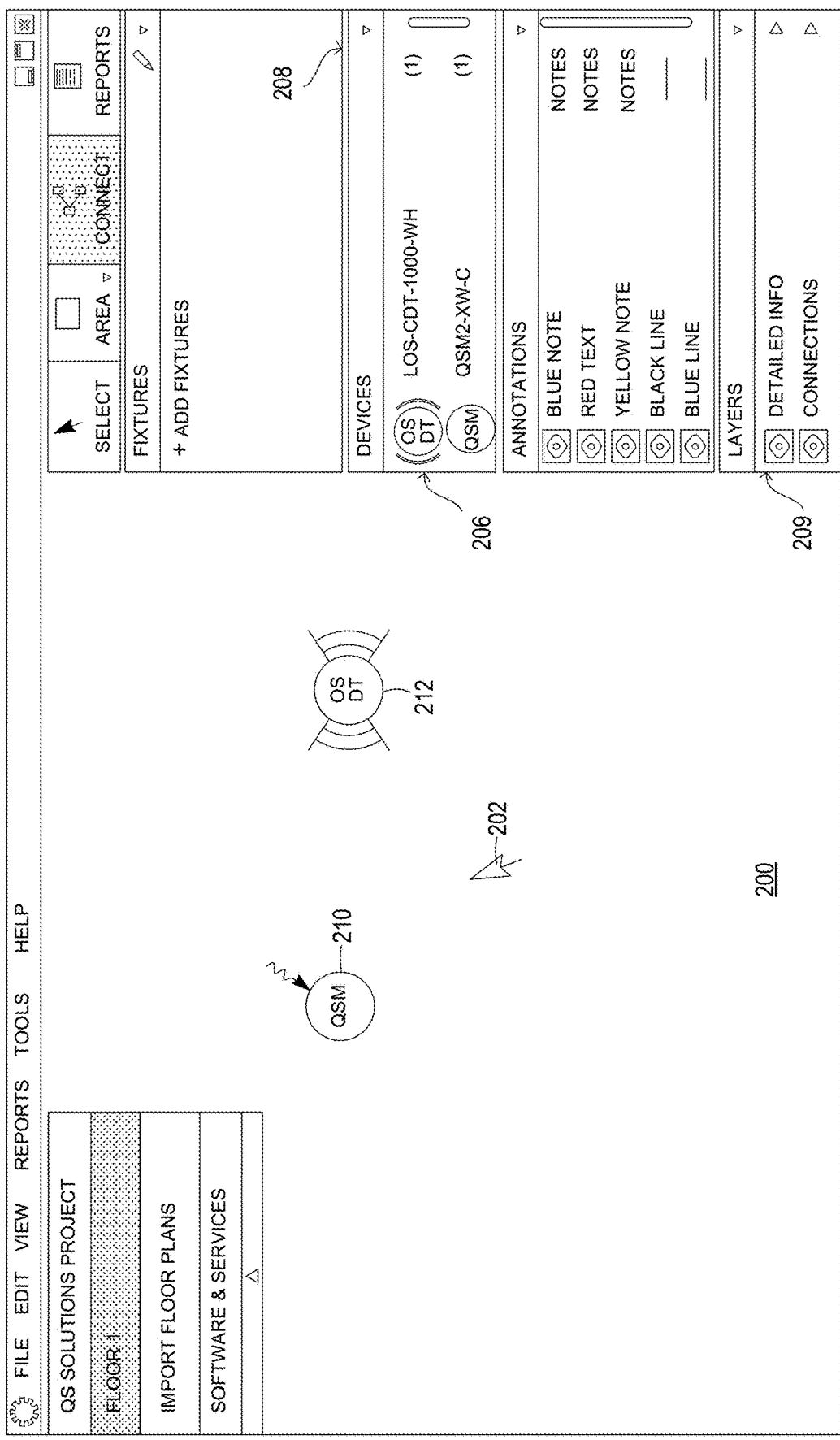
FIGS. 2-16 illustrate example graphical representations of a user interface that may be displayed on a visual display of a network device by a design software, e.g., a graphical user interface (GUI) software, for designing and configuring a load control system (e.g., a building control system).

The design software may display a palette column 205 (e.g., a column of palettes). The palette column may be located, for example, to the right of the canvas 200, as shown in FIG. 2. The palette column 205 may include one or more windows (e.g., palettes). The windows (e.g., palettes) may include items that may be added to the canvas 200, such as fixtures (e.g., lighting fixtures), devices (e.g., control devices of the load control system), and/or annotations. For example, a devices window 206 may display one or more control devices of the load control system, which may be added to the canvas 200. The user may add additional control devices to the devices window 206 by clicking on a button (e.g., an "add devices" button 208) on the devices window 206. The "add devices" button 208 may be signified by one or more symbols, such as a "+" character. The palette column 205 may have a layers window 209. For example, the layers window 209 may be provided to allow a user to select one or more layers to show and/or hide pieces of information on the canvas 200.

As shown in FIG. 2, the design software may display one or more icons on the canvas 200. For example, the design software may display a first icon 210 (e.g., representing a first electrical device) and/or a second icon 212 (e.g., representing a second electrical device) on the canvas 200. The first electrical device may be a control-target device, such as a sensor module or a load control device, and/or the second electrical device may be a control-source device, such as an occupancy sensor. The first electrical device may be an electrical load, such as a lighting load. The second electrical device may be a load control device, such as a dimmer switch for controlling the electrical load.

The user may create (e.g., define) a relationship between the first electrical device and the second electrical device. For example, the relationship may define an electrical connection (e.g., a physical electrical connection, such as power wiring) between the first and second electrical devices, and/or an association between the first and second electrical devices (e.g., a control relationship, such as an association between wireless control devices). The relationship may be stored in an association table or dataset (e.g., in the computer 144 and/or the system controller 150). The relationship table or dataset may include an identifier (e.g., a unique identifier) of devices in the load control system. The relationship table or dataset may also, or alternatively, include an identifier (e.g., unique identifier) of the relationships of the devices. The identifier (e.g., unique identifier) of devices in the load control system may correspond to the identifier (e.g., unique identifier) of the relationships of the devices. The relationship information in the relationship table or dataset, including the unique identifiers, may be uploaded to the control-source devices, control-target devices, system controller, etc., for enabling control of electrical loads and/or communications (e.g., load control communications) between the related devices.

Figure 3:
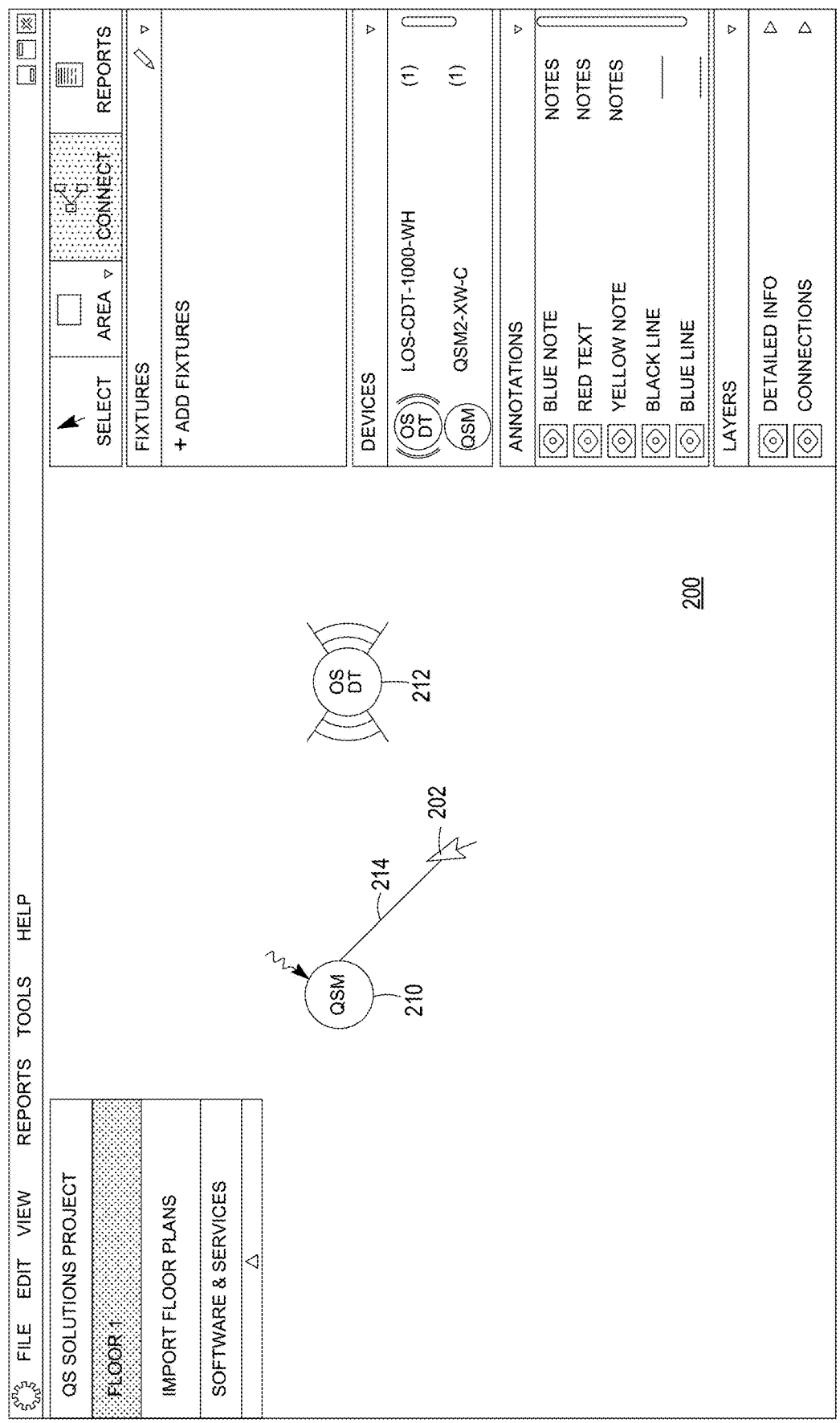

The user may make a relationship (e.g., a connection or an association) between the first electrical device and the second electrical device by drawing a line between the first electrical device (e.g., the first icon 210) and the second electrical device (e.g., the second icon 212) on the canvas 200. The user may select the first icon 210 with the cursor 202 (e.g., by actuating a button on the mouse). The user may select the first icon 210 with the cursor 202, for example, to cause the design software to generate a line 214 (e.g., a straight line) on the canvas 200 that may begin at the first icon 210 (e.g., at a first end of the line) and that may end at the cursor 202 (e.g., at a second end of the line), as shown in FIG. 3. The first end of the line 214 may remain anchored at the first icon 210 and/or the second end of the line 214 may move around. For example, the second end of the line 214 may move around as the cursor 202 moves around the canvas 200. The user may select the second icon 212 with the cursor 202 (e.g., by actuating a button on the mouse) to create a relationship between the first electrical device (e.g., the first icon 210) and the second electrical device (e.g., the second icon 212).

Figure 4:
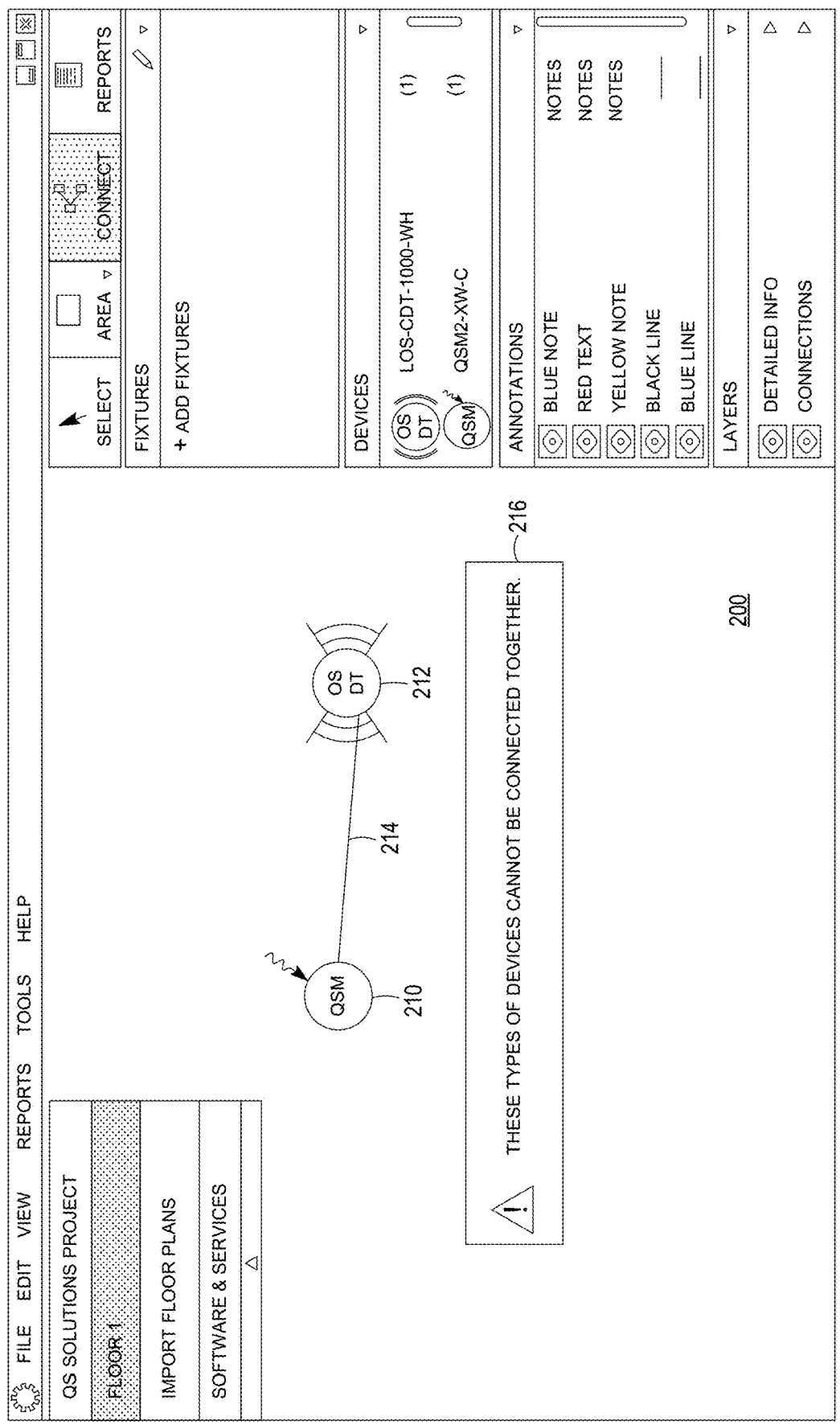

The design software may display a warning window 216 informing the user of an error, as shown in FIG. 4. For example, the design software may display a warning window 216 informing the user of the error, if electrical devices (e.g., the first electrical device and the second electrical device) are not compatible to work together during normal operation of the load control system. For example, the electrical devices may not be connectable to one another. The design software may display a warning window 216 informing the user of the error if the electrical devices cannot be connected to one another. The electrical devices may not be connectable to one another if the first electrical device has a power requirement that is incompatible with the second electrical device, if the first electrical device and the second electrical device use different communication links (e.g., the first electrical device uses a wired communication link and the second electrical device uses a wireless communication link), and/or if the first electrical device has software that is incompatible with the second electrical device. The electrical devices may not be connectable to one another if the number of devices to be connected to one another has been exceeded.

Figure 5:
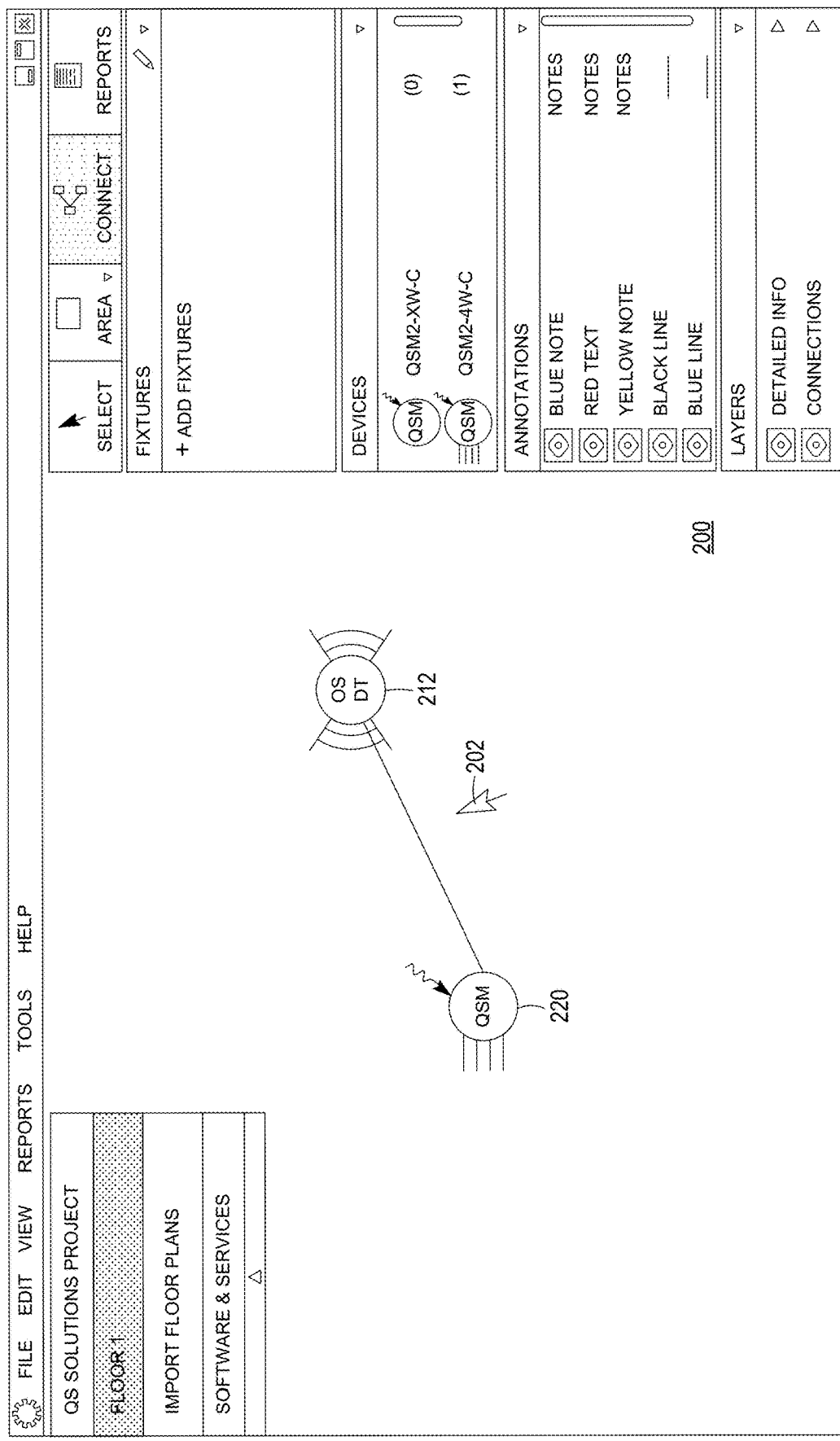

As shown in FIG. 5, the second electrical device (e.g., represented by the second icon 212) may be compatible with a third electrical device. The third electrical device may be represented by a third icon 220. When the user selects the third icon 220 with the cursor 202, the line 214 may be fixed (e.g., secured) between the second icon 212 and the third icon 220. The line 214 may change color after becoming fixed between icons. For example, the line 214 may change color after becoming fixed between the second icon 212 and the third icon 220. After the line 214 is fixed between the icons, the design software may create a relationship between the electrical devices that are represented by the icons. For example, after the line 214 is fixed between the second icon 212 and the third icon 220, the design software may create a relationship between the second electrical device and the third electrical device. The second electrical device may be represented by the second icon 212 and the third electrical device may be represented by the third icon 220, respectively.

Figure 6:
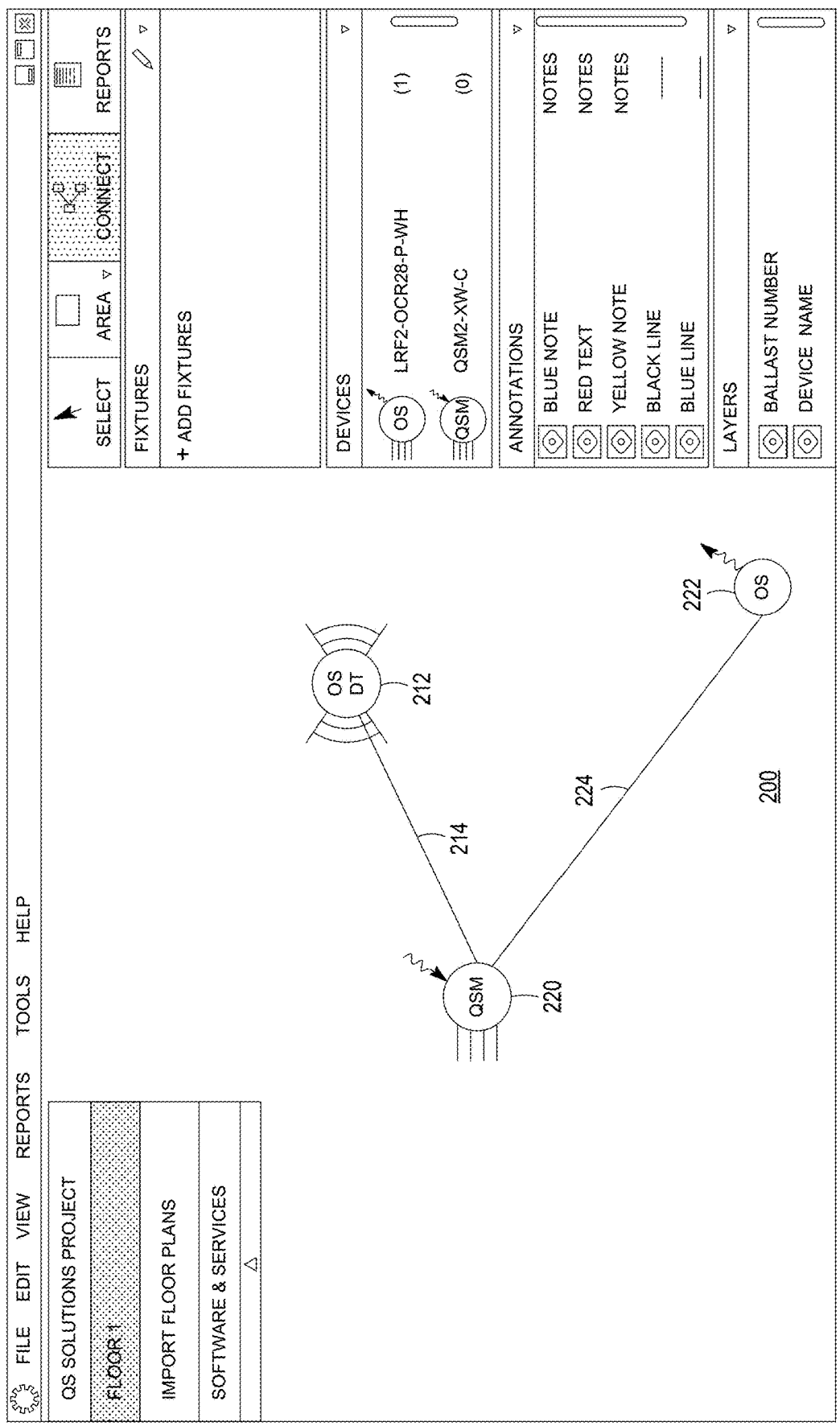

The third electrical device may be related to (e.g., associated with) a fourth electrical device (e.g., represented by a fourth icon 222). For example, the third electrical device may be associated with a fourth electrical device (e.g., represented by a fourth icon 222) in response to the user drawing a line 224 between the third icon 220 and the fourth icon 222, as shown in FIG. 6. The lines connecting electrical devices (e.g., lines 214, 224) may define relationships between respective electrical devices. The lines 214, 224 defining the relationships between the electrical devices may represent types of electrical connections. For example, the lines defining the associations between the electrical devices may represent load wiring, wired analog or digital communication links, wireless communication links, etc. The lines 214, 224 defining the relationships between the electrical devices may represent types of electrical connections according to the line type of the respective line. For example, as shown in FIG. 6, the line 214 between the second icon 212 and the third icon 220 may be solid to represent a wired communication link. The line 224 between the third icon 220 and the fourth icon 222 may be dashed, for example, to represent a wireless communication link (e.g., an association between wireless control devices).

Figure 7:
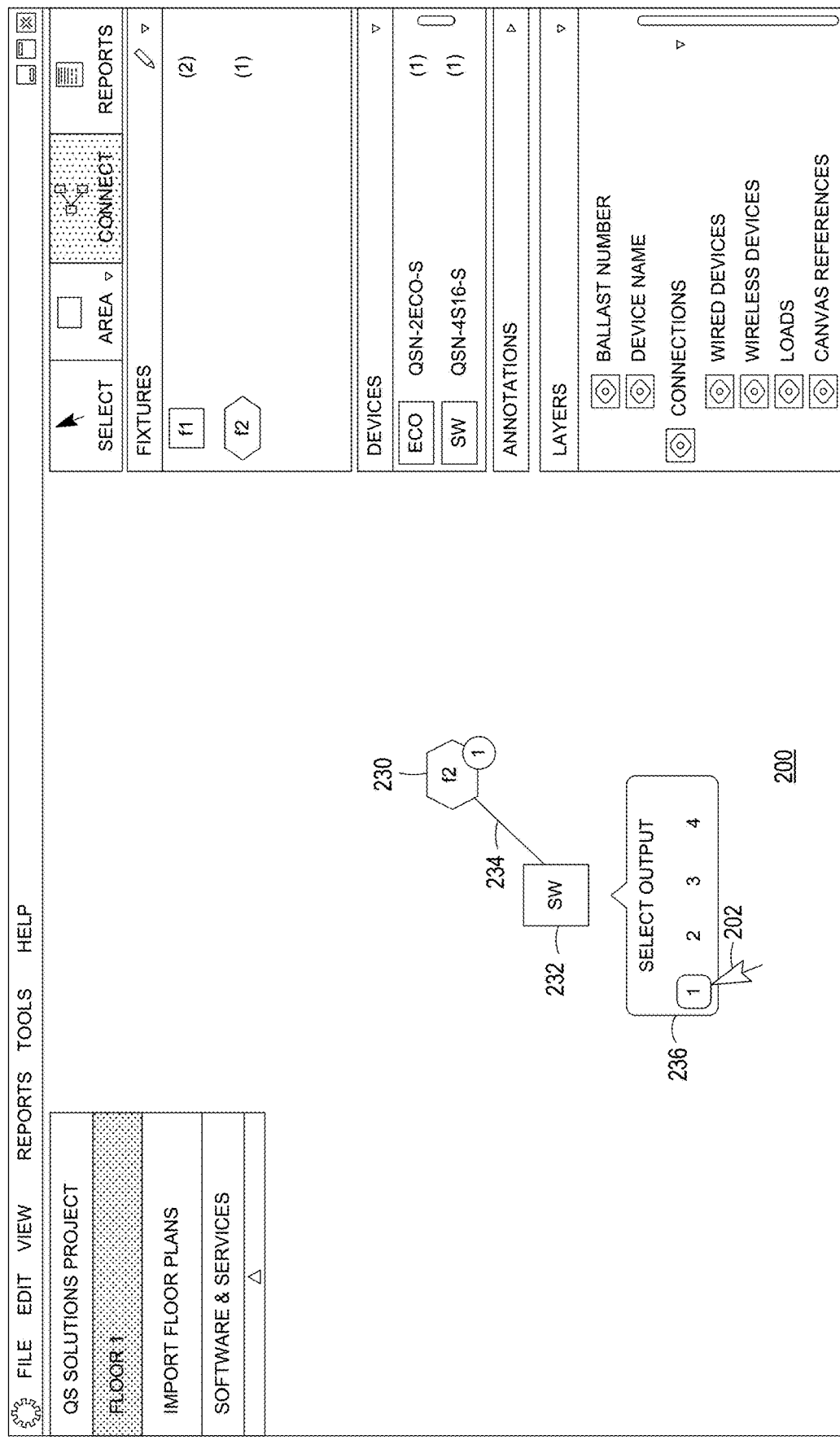

As shown in FIG. 7, a fifth electrical device (e.g., an electrical load) represented by a fifth icon 230 may be connected to one or more outputs of a sixth electrical device (e.g., a load control device, such as a multiple-zone switching module) represented by a sixth icon 232. For example, the user may draw a line 234 from a fifth icon 230 (e.g., representing the fifth electrical device) to a sixth icon 232 (e.g., representing the sixth electrical device).

An output-selection window may be displayed when the user selects an icon. For example, when the user selects the sixth icon 232 with the cursor 202, an output-selection window 236 may be displayed next to the sixth icon 232. The user may select one of the outputs of the sixth electrical device (e.g., represented by the sixth icon 232) with the cursor 202. The line 234 may change color when the user selects one of the outputs of the sixth electrical device (e.g., represented by the sixth icon 232). The line 234 may change color, for example, to indicate different states of line connections. For example, the line 234 may be black when the user is attempting to make a connection with line 234. The color of the line 234 may change from black to another color when the connection from line 234 is made. For example, the color of the line 234 may change when a connection with line 234 is confirmed. The color of the line 234 may change to indicate different communication links. For example, the color of the line 234 may be different for wired and wireless communication links. The design software may create a relationship (e.g., an association) between the fifth electrical device and the selected output of the sixth electrical device. For example, the design software may create an association between the fifth electrical device and the selected output of the sixth electrical device when the user selects one of the outputs of the sixth electrical device.

Figure 8:
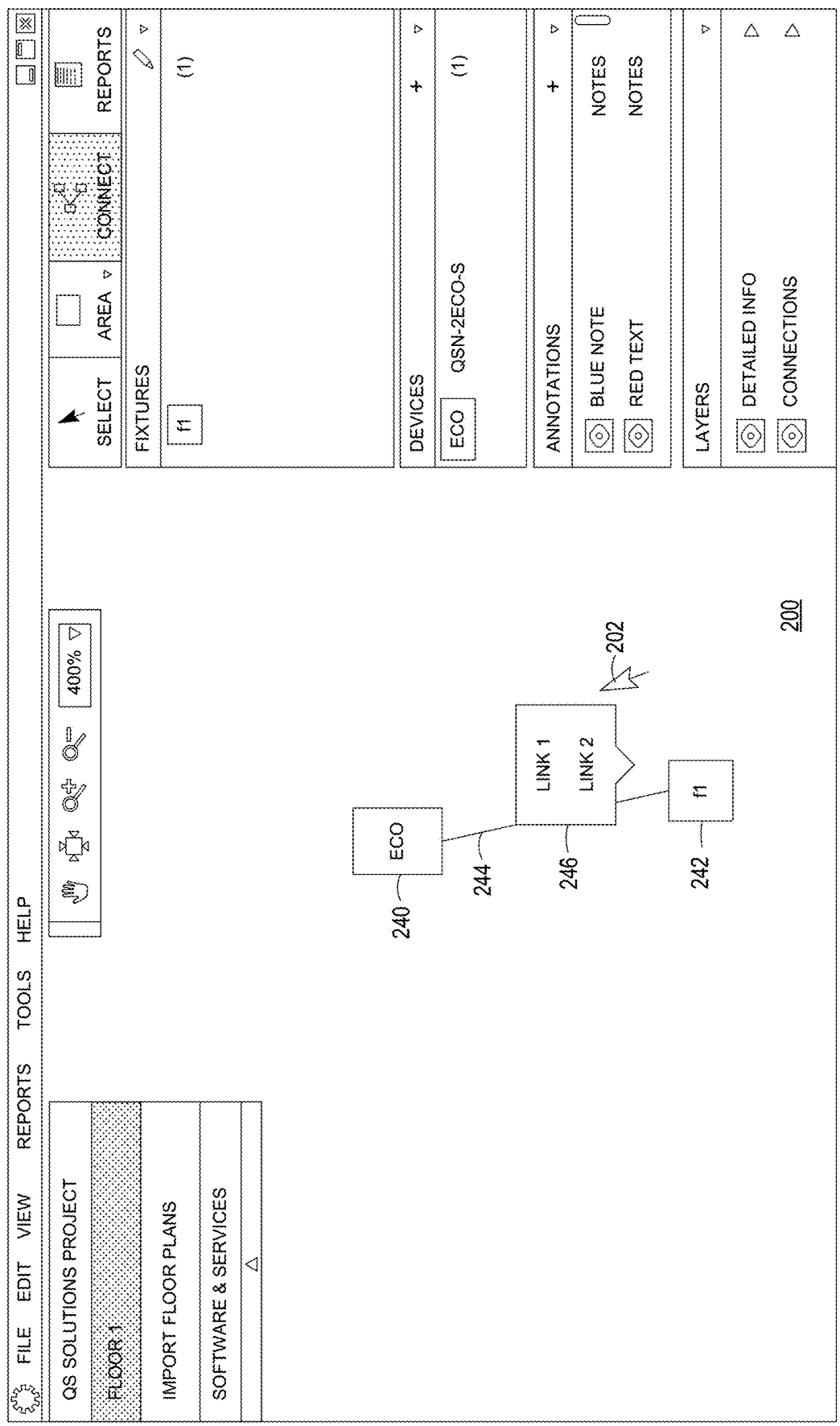
Figure 9:
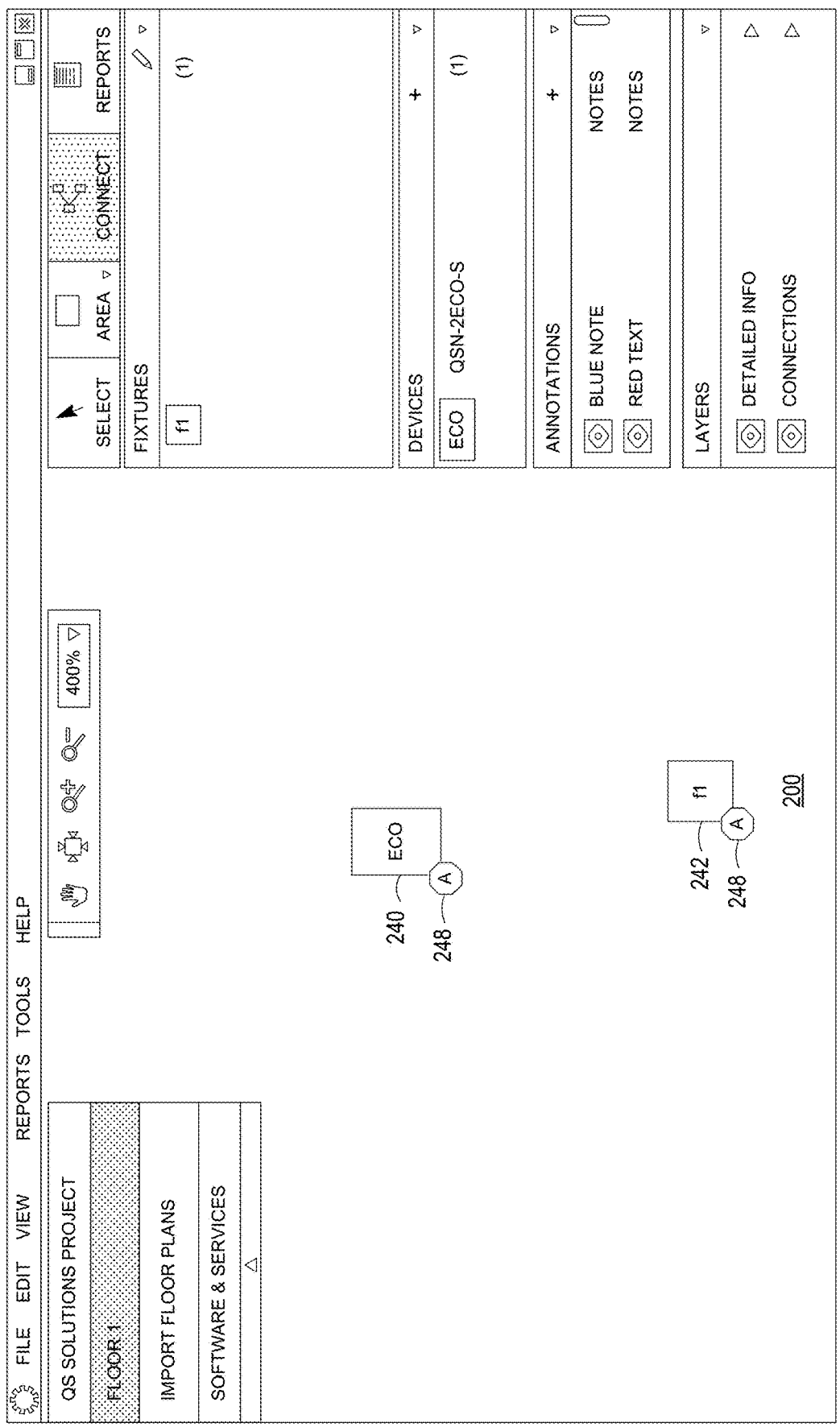

As shown in FIGS. 8 and 9, a seventh electrical device (e.g., digital bus supply device) represented by an seventh icon 240 may be connected to an eighth electrical device (e.g., a load control device, such as a light-emitting diode (LED) driver) represented by an eighth icon 242. The seventh electrical device may be connected to the eighth electrical device via a wired digital communication link. One or more LED drivers may be connected to the digital communication link. For example, one or more LED drivers may be connected to the digital communication link in any order. For example, the position that the LED drivers are wired along the digital communication link may be organized in a certain manner or may be organized in a random order.

The user may create a connection between the seventh icon 240 (e.g., representing the seventh electrical device) and the eighth icon 242 (e.g., representing the eighth electrical device) by drawing a line 244 between the seventh icon 240 and the eighth icon 242, as shown in FIG. 8. After the user connects the seventh icon 240 and the eighth icon 242 (e.g., with the line 244), a link-selection window 246 may be displayed. For example, the link-selection window 246 may be displayed next to the line 244. The link-selection window 246 may allow the user to select one or more wired digital communication links that may be connected to the seventh electrical device. After the user selects one or more of the wired digital communication links from the links-selection window 246, the design software may stop generating and/or displaying the line 244 between the seventh icon 240 and the eighth icon 242, as shown in FIG. 9.

The design software may display a badge 248 on one or more icons. For example, the design software may display a badge 248 having a notation (e.g., the letter A) on one or more icons. As an example, the design software may display a badge 248 having an identical notation (e.g., the letter A) on the seventh icon 240 and the eighth icon 242, to indicate that a connection exists between the seventh electrical device and the eighth electrical device. A badge may be provided, for example, when the connection order of the devices is less important or unimportant. For example, a badge may be provided when the connection between drivers may be connected on the digital communication link in any order. The badges may be displayed to provide a more efficient use of display space on the user interface. As connections between devices increases on the display, the representation of the connections may become confusing. The badges may occupy less display space and may provide for an organized and efficient identification of connections.

As shown in FIGS. 10-13, a relationship (e.g., an association) may be made between one or more devices located on one or more floors (e.g., floor plans) or canvases. The one or more devices may be located on a same floor, and/or the devices may be located on different floors. For example, the one or more devices may be located on one or more floors of a building in which the load control system may be installed. A single floor may be shown on a canvas and/or multiple floors may be shown on a canvas.

Figure 10:
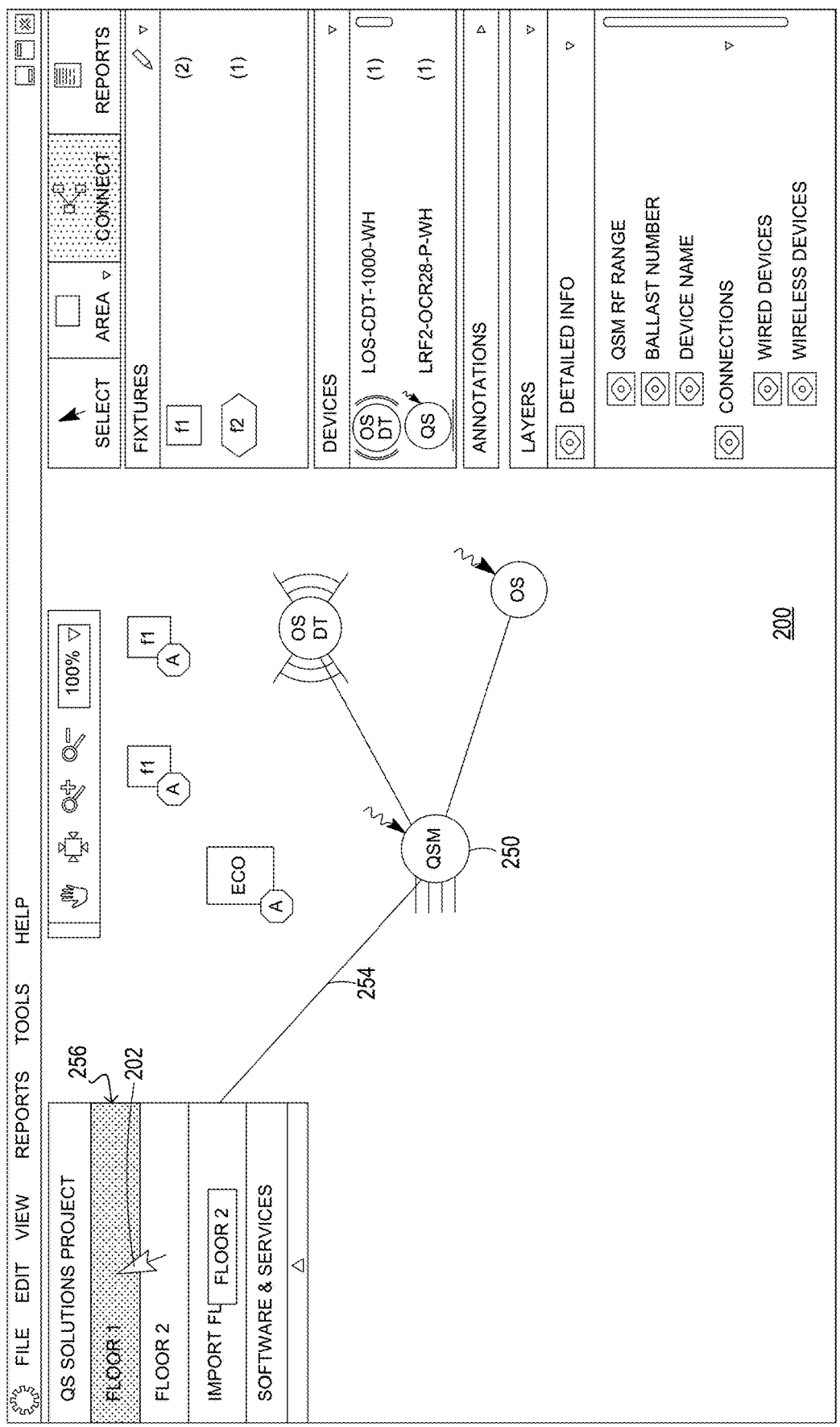
Figure 11:
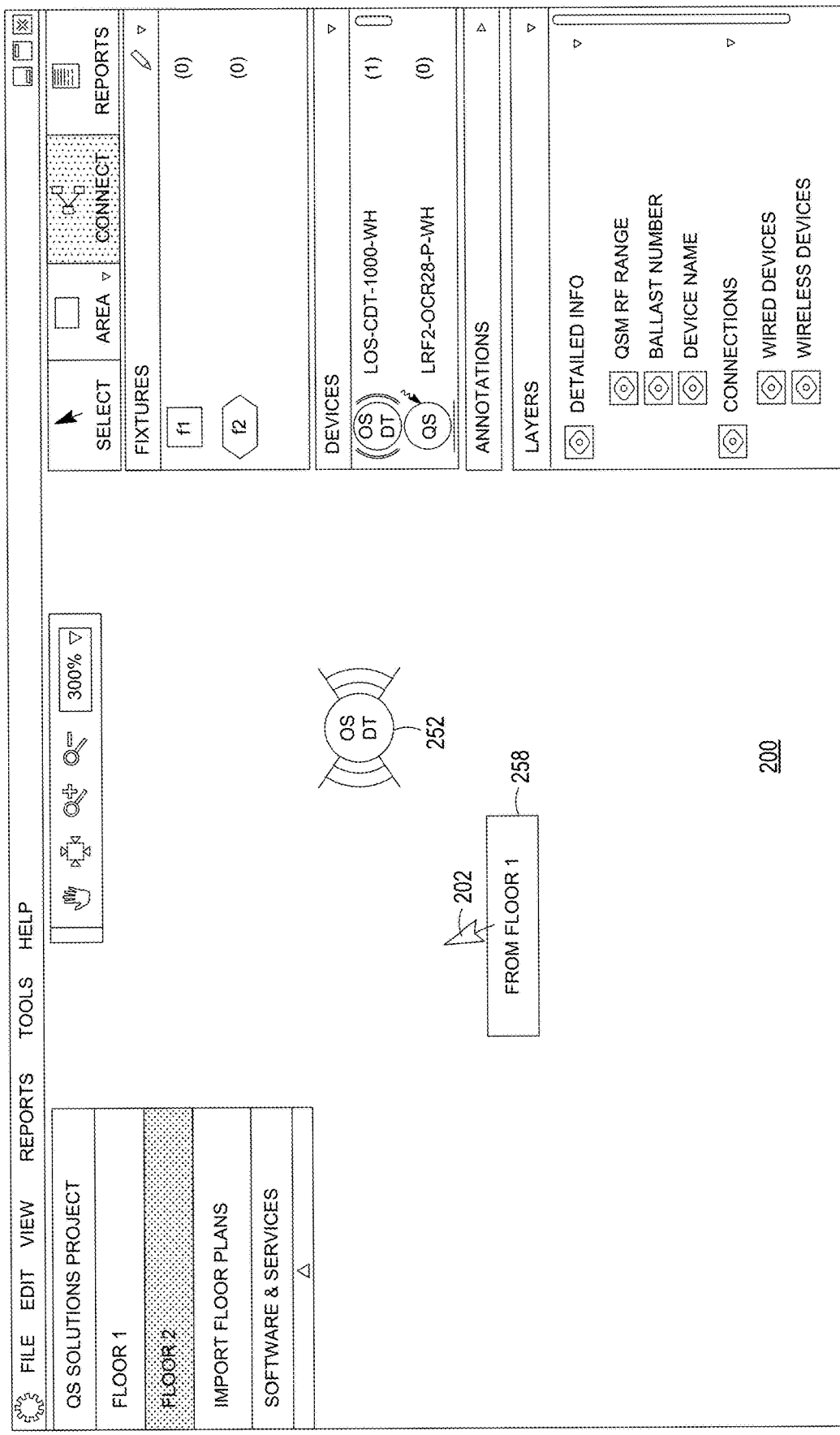
Figure 12:
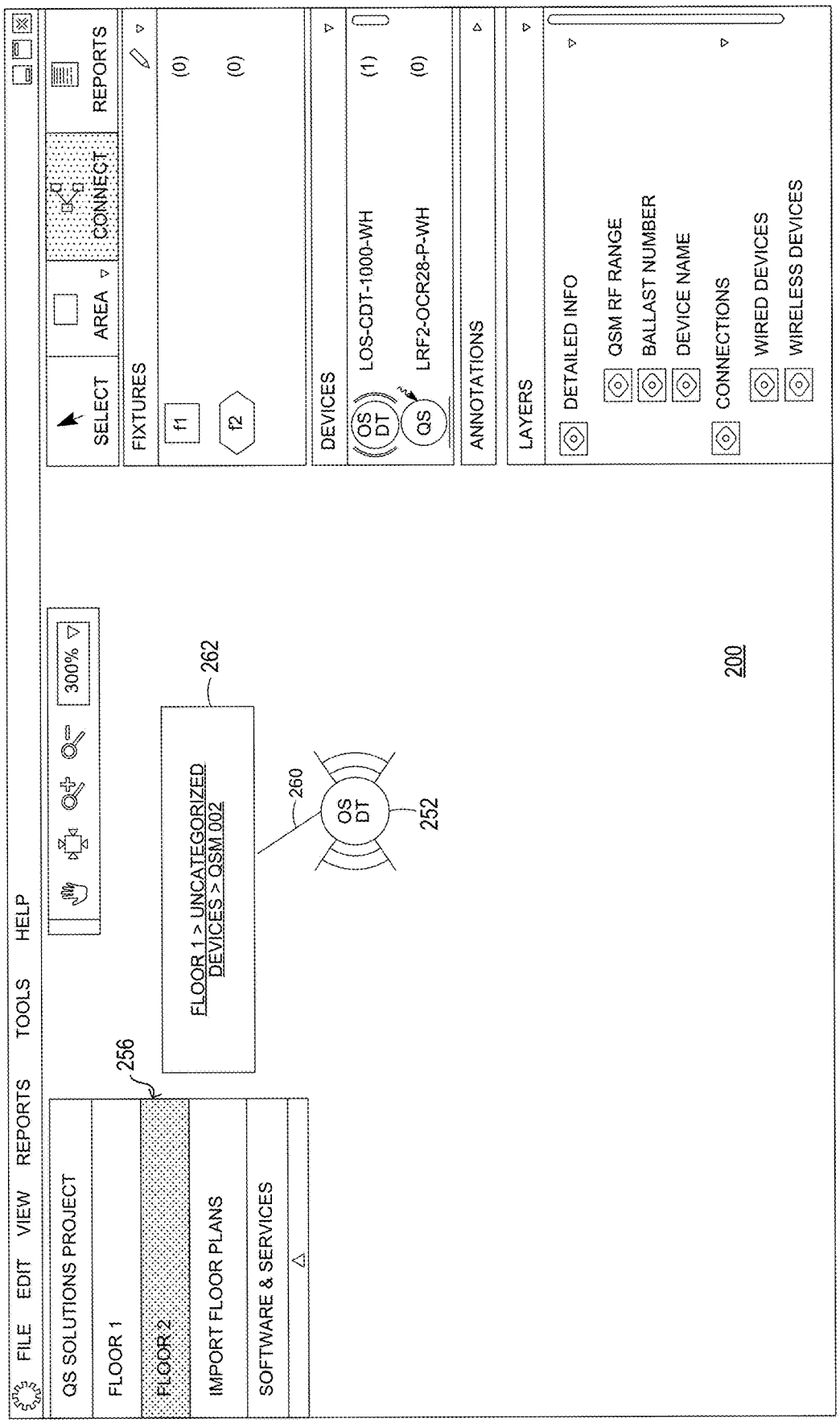

For example, an association (e.g., represented by line 254) may be made between a ninth electrical device (e.g., represented by the ninth icon 250) located on a first floor, as shown in FIG. 10, and a tenth electrical device (e.g., represented by the tenth icon 252) located on a second floor, as shown in FIG. 11. The user may select a ninth icon 250 (e.g., representing the ninth electrical device) and the design software may generate a line 254 extending from the ninth icon to the cursor 202. The cursor 202 may be positioned upon a floor window 256. The user may select a specific floor from the floor window 256, as shown in FIG. 10. After the user selects a specific floor (e.g., the second floor) from the floor window 256, the design software may display a tenth icon 252 representing the tenth electrical device, as shown in FIG. 11. The design software may display a floor cursor box 258 below the cursor 202 to indicate the floor on which the ninth electrical device is located. After the user selects the tenth icon 252, the design software may generate a line 260 between the tenth icon 252 and a floor indicator box 262. Line 260 may indicate the connection (e.g., fixed connection) between the tenth icon 252 and the ninth electrical device (e.g., represented by the ninth icon 250). Line 260 may also, or alternatively, indicate the connection (e.g., fixed connection) between the tenth icon 252 and the floor on which the ninth electrical device is located, as shown in FIG. 12.

Figure 13:
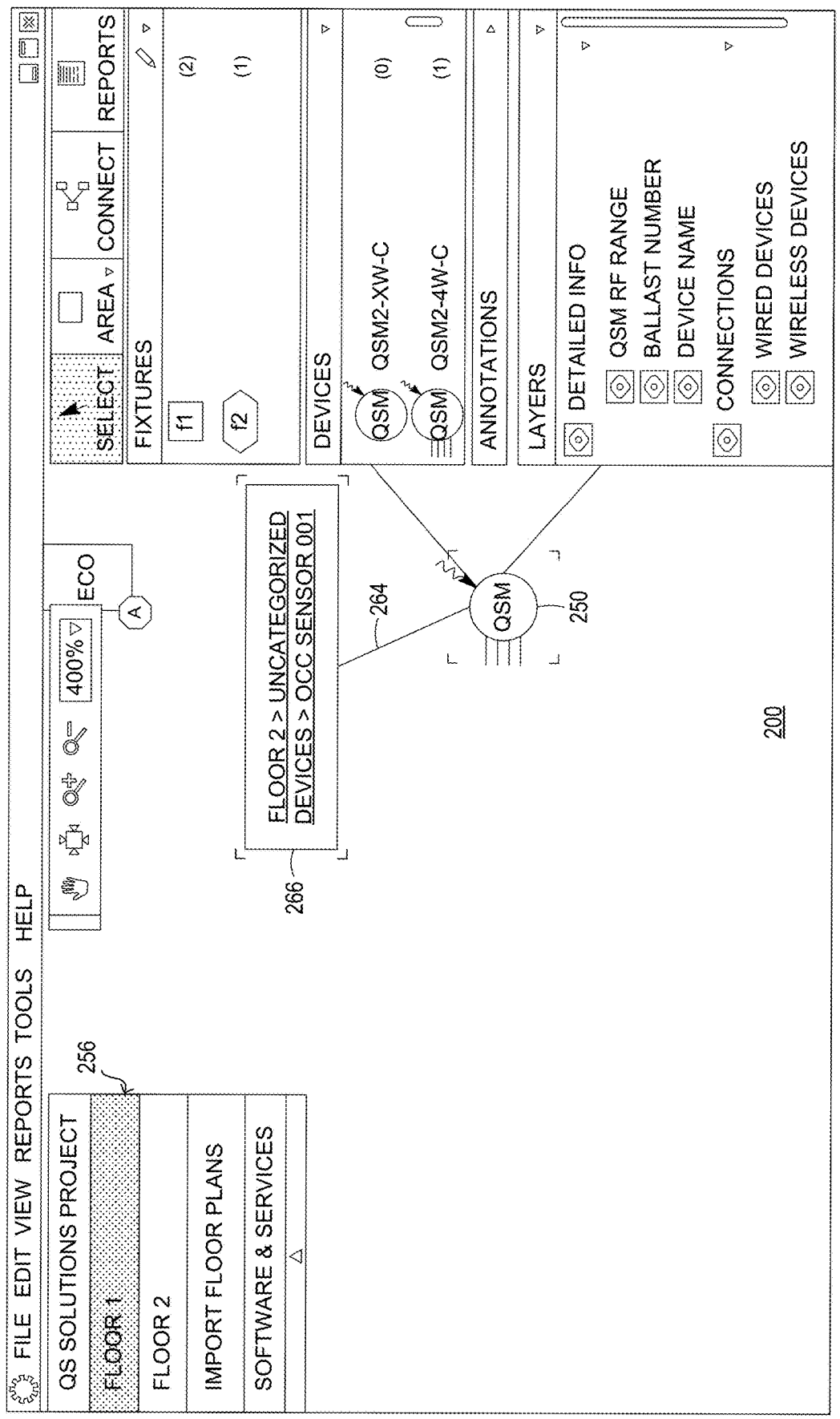

The floor indicator box 262 may include a link to redirect the user to the floor (e.g., floor plan) and/or the canvas being indicated. As shown in FIG. 13, the user may select the first floor from the floor window 256 to display the ninth icon 250. After the user makes the connection between the ninth electrical device (e.g., represented by the ninth icon 250) and the tenth electrical device (e.g., represented by the tenth icon 252), the design software may generate a line 264 between the ninth icon 250 and a floor indicator box 266 that may indicate the floor on which the tenth electrical device is located. The floor indicator box 266 may include a link to redirect the user to the floor being indicated.

Figure 14:
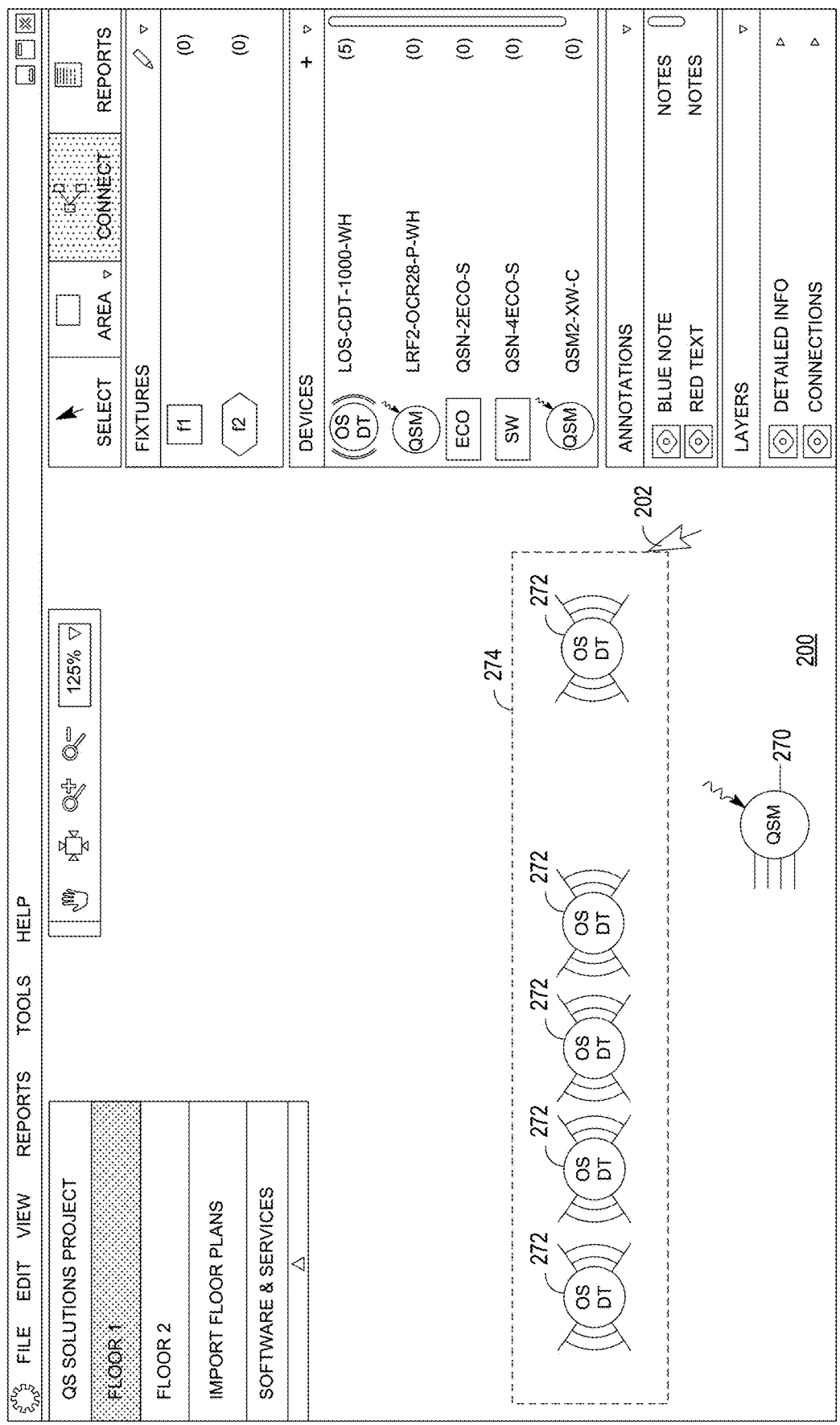
Figure 15:
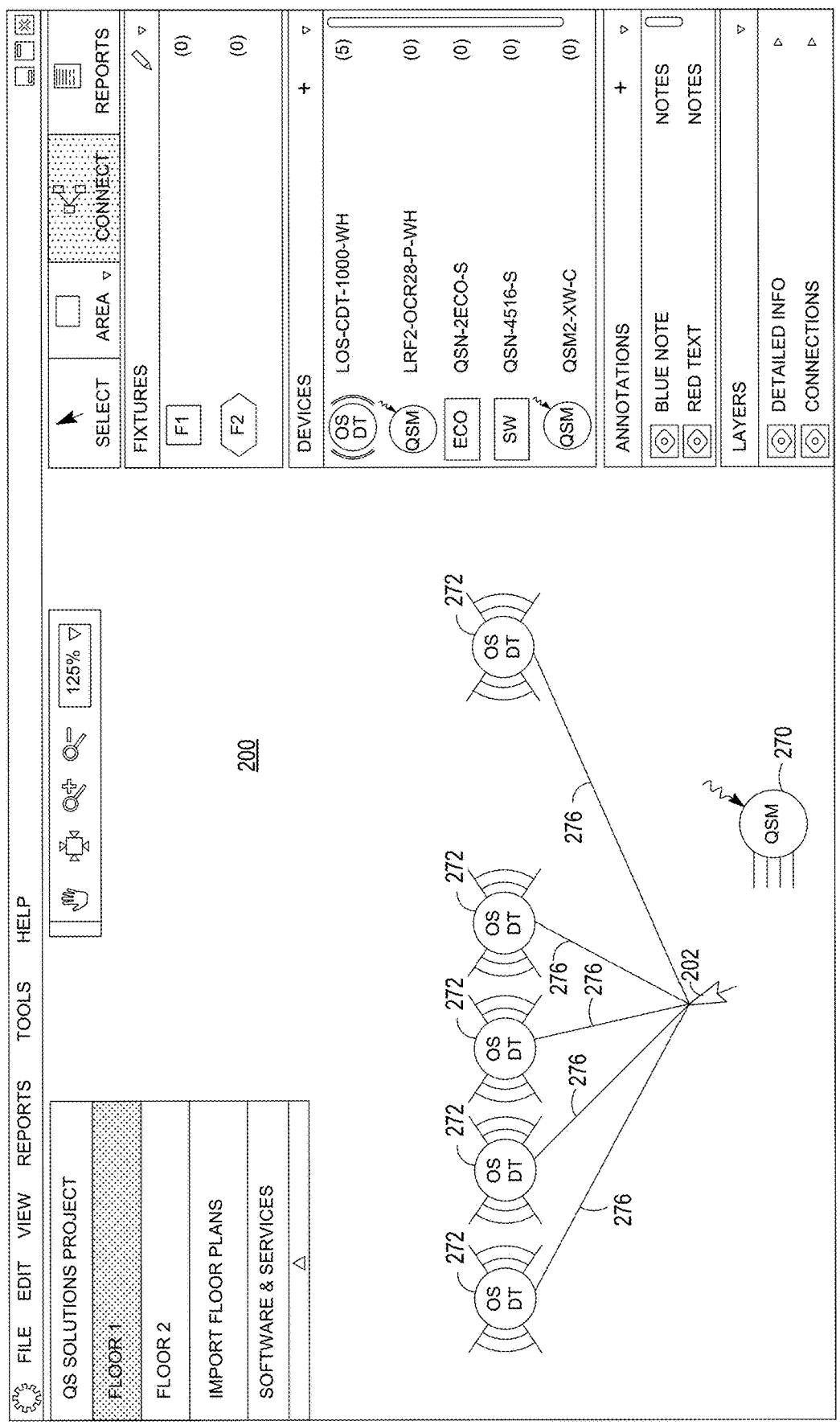
Figure 16:
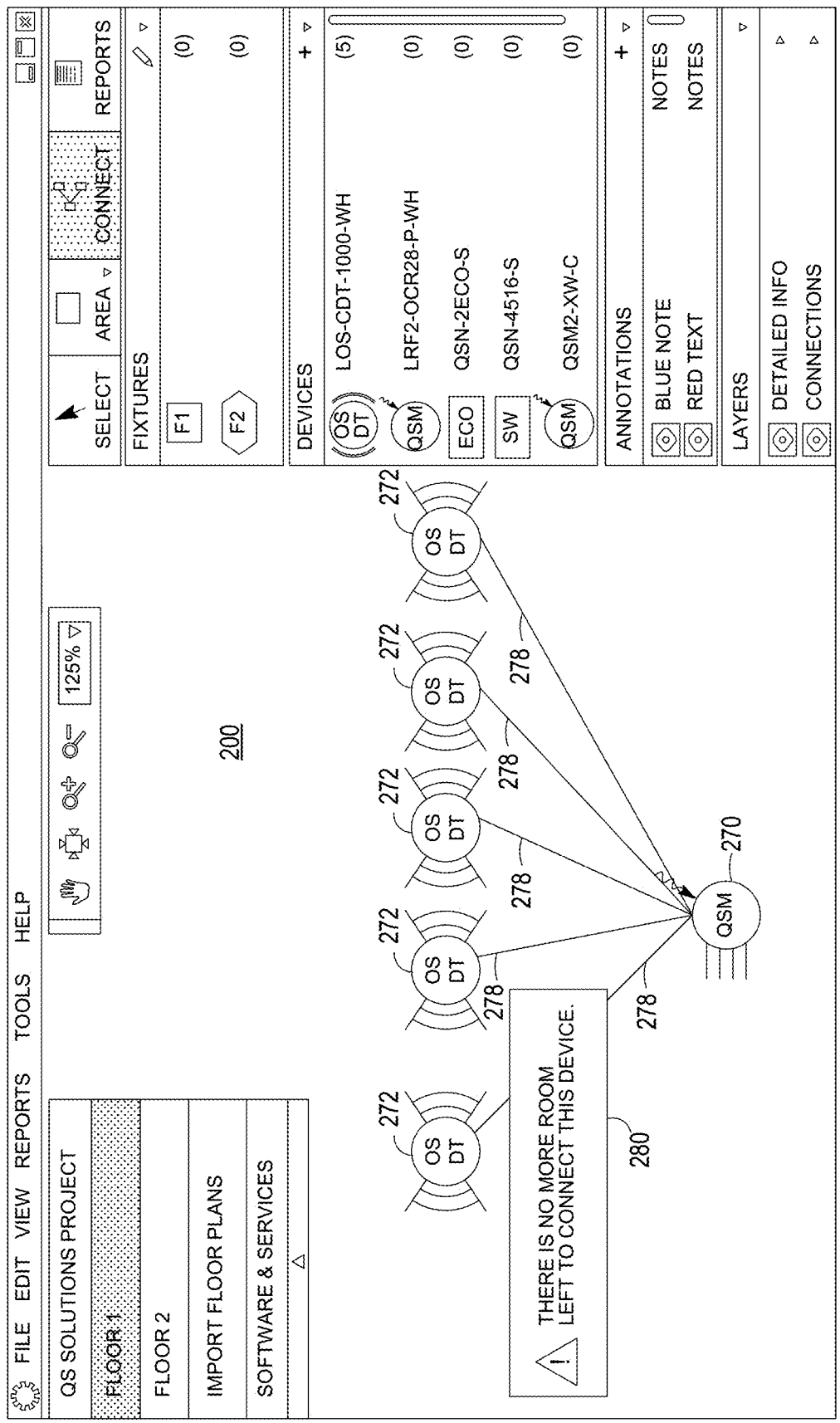

As shown in FIGS. 14-16, an electrical device may be related to (e.g., associated with) one or more other electrical devices. For example, an electrical device may be associated with one or more other electrical devices at one time. The user may select one or more of icons 272 (e.g., representing one or more electrical devices) by dragging the cursor 202 to generate a selection box 274 surrounding the icons 272, as shown in FIG. 14. The design software may generate one or more lines connecting an electrical device with one or more other electrical devices. For example, as shown in FIG. 15, the design software may generate lines 276 that connect to (e.g., begin at) one or more of the icons 272 representing one or more of the electrical devices. The lines 276 may connect to (e.g., end at) the cursor 202, as shown in FIG. 15. The user may select an icon 270 representing an electrical device with the cursor 202 to create an association between the electrical device represented by the icon 270 and one or more of the electrical devices represented by the icon 272.

The electrical device represented by the icon 270 may be capable of being connected to and/or associated with one or more devices that may be less than, or equal to, the number of electrical devices represented by the icons 272. For example, the electrical device represented by the icon 270 may be capable of being related to (e.g., connected to and/or associated with) one or more devices that may be less than, or equal to, the number of electrical devices selected by the selection box 274. The design software may create associations between the electrical device represented by the icon 270 and a subset of the plurality of electrical devices, as shown in FIG. 16. The design software may generate lines (e.g., fixed lines 278) between the icon 270 representing the electrical device and the icons 272 representing the subset of the plurality of electrical devices (e.g., four electrical devices as shown in FIG. 16). The design software may generate and/or omit a line between the icon 270 representing the electrical device and an icon 272' representing a fifth one of the plurality of electrical devices.

The design software may display a warning window 280 indicating an error condition, as shown in FIG. 16. For example, the design software may display a warning window 280 informing the user of an error if one or more of the electrical devices (e.g., represented by icons 272) are not compatible to work with an electrical device (e.g., represented by icon 270) during normal operation of the load control system. The design software may display a warning window 280 informing the user of the error if the electrical device (e.g., represented by icon 270) cannot be connected to one or more of the electrical devices (e.g., represented by icon 272). The electrical devices may not be connectable to one another, for example, if a maximum number of devices connectable to a device has been met. For example, additional electrical devices may not be connectable to an electrical device (e.g., represented by icon 270) if the maximum number of devices connectable to the electrical device (e.g., represented by icon 270) has been met. The electrical devices may not be connectable to one another, for example, if the electrical device (e.g., represented by icon 270) has a power requirement that is incompatible with one or more of the electrical devices (e.g., represented by icon 272). The electrical devices may not be connectable to one another if the electrical device (e.g., represented by icon 270) and the plurality of electrical devices (e.g., represented by icon 272) use different communication links. For example, the electrical devices may not be connectable to one another if the electrical device uses a wired communication link and the plurality of electrical device uses a wireless communication link. The electrical devices may not be connectable to one another if the electrical device (e.g., represented by icon 272) has software that is incompatible with the plurality of electrical devices (e.g., represented by icon 272), etc. The design software may not generate a line between the plurality of electrical devices (e.g., represented by icons 272) and the electrical device (e.g., represented by icon 270), for example, if the plurality of electrical devices are not compatible to work with the electrical device and/or if the electrical device cannot be connected to one or more of the plurality of electrical devices.

Electrical devices that are coupled together (e.g., via a wired digital communication link) and/or that communicate with one another may be grouped together in zones. For example, electrical devices that are coupled together (e.g., via a wired digital communication link) and/or that communicate with one another may be grouped together in zones to be controlled together in response to a control-source device (e.g., the remote control device 122, the occupancy sensor 110, the daylight sensor 108, and/or the window sensor 120 shown in FIG. 1). For example, the seventh and eighth electrical devices of FIGS. 8 and 9 may be grouped together in zones to be controlled together in response to a control-source device.

Figure 17:
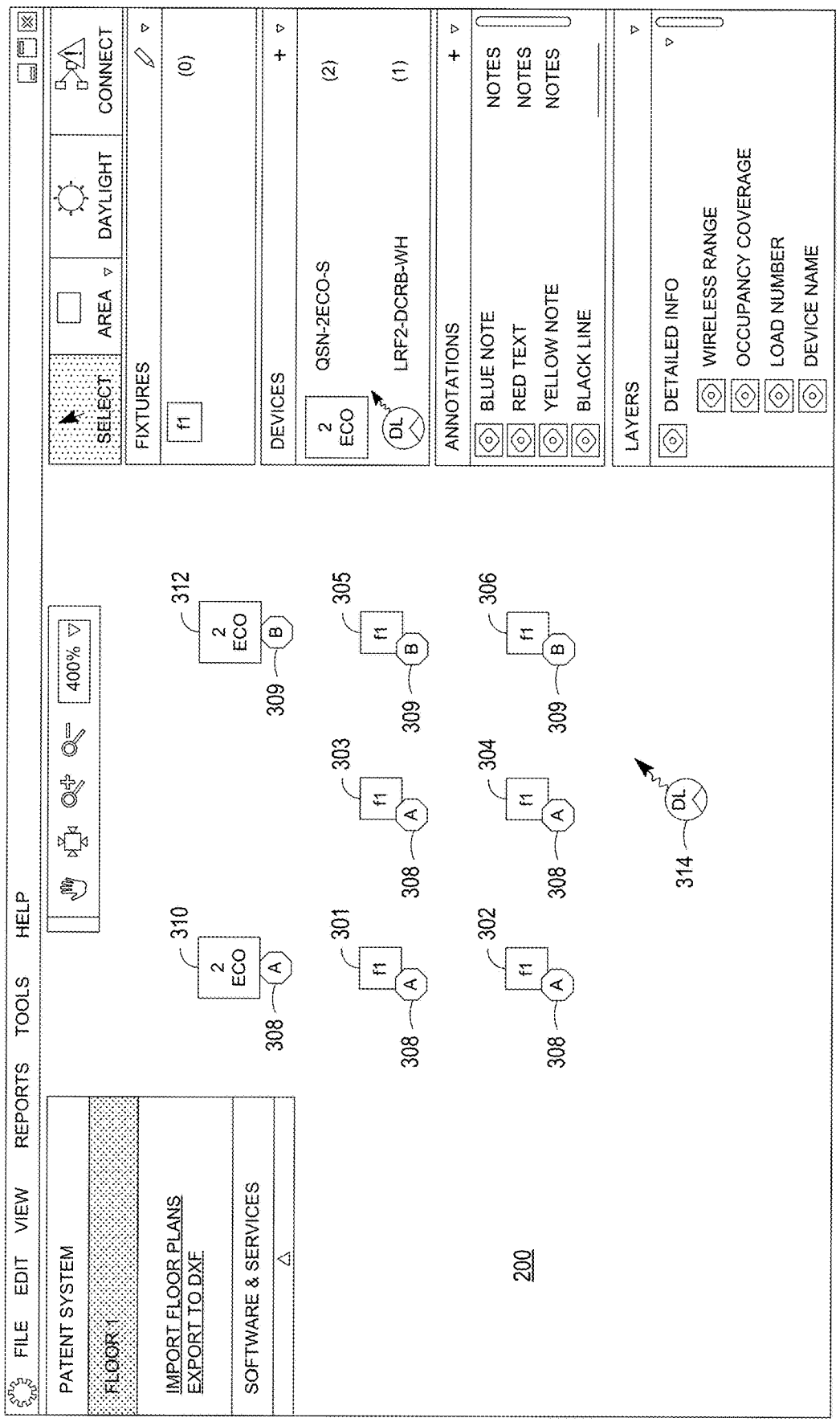
FIGS. 17-29 illustrate example graphical representations of a user interface that may be displayed on the visual display of the network device by the design software for grouping together (e.g., into one or more zones) the control-target devices of the load control system.

FIGS. 17-28 illustrate example graphical representations of a user interface that may be displayed on the visual display of the network device by the design software for grouping together (e.g., grouping together into one or more zones) the control-target devices of the load control system. The control devices may be grouped together independent of whether the control devices are coupled to a wired digital communication link. The control devices may be grouped together independent of which wired digital communication link the control devices may be coupled to. For example, as shown in FIG. 17, the canvas 200 may show icons 301-306 representing control-target devices (e.g., LED drivers in lighting fixtures). Four of the LED drivers (e.g., represented by icons 301-304) may be coupled to a first digital communication link of a first digital bus supply device that is represented by an icon 310 (e.g., as indicated by badges 308). Two of the LED drivers (e.g., as represented by icons 305-306) may be coupled to a second digital communication link of a second digital bus supply device that is represented by an icon 312 (e.g., as indicated by badges 309).

The icons 301-304 (and the corresponding badges 308) of the LED drivers coupled to the first digital communication link may be a first color, and the icons 305-306 (and the corresponding badges 309) of the LED drivers coupled to the second digital communication link may be a second color. For example, as shown in FIG. 17, the icons 301-304 (and the corresponding badges 308) of the LED drivers coupled to the first digital communication link may be green, and the icons 305-306 (and the corresponding badges 309) of the LED drivers coupled to the second digital communication link may be red. The use of one or more colors and/or patterns may be used to visually indicate to the user that the LED drivers are connected to one or more digital communication links. The canvas 200 may show an icon 314, for example, representing a daylight sensor.

Figure 18:
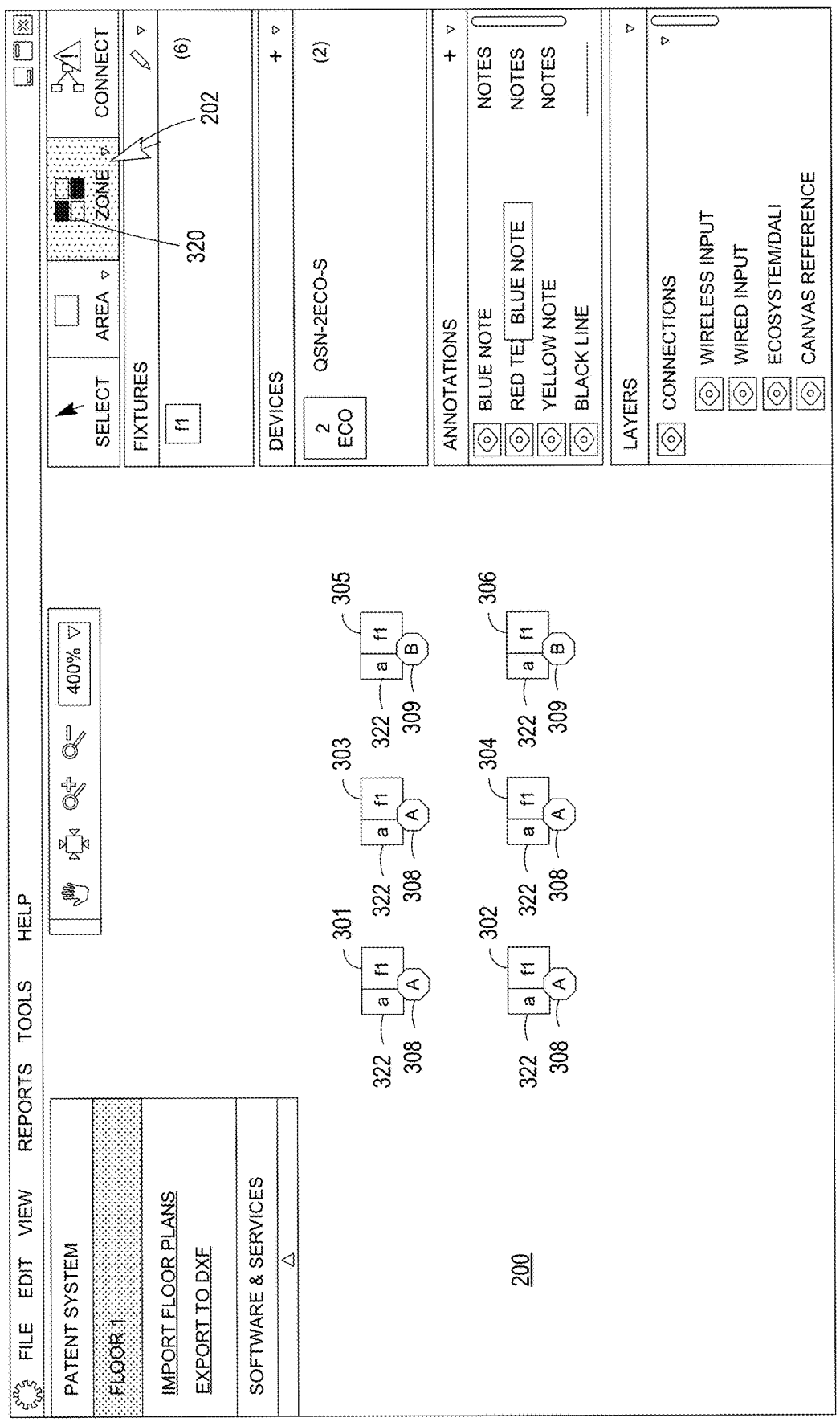

As shown in FIG. 18, the user may select a zone button 320 with the cursor 202 (e.g., by actuating a button on the mouse). Selecting the zone button 320 may cause the design software to change to a zone assignment mode. In a zone assignment mode, icons may be appended with a zone assignment indicator. For example, in the zone assignment mode, one or more of the icons 301-306 of the LED drivers may be appended with a zone assignment indicator 322. The LED drivers may be assigned to a same zone (e.g., as indicated by an "a" in FIG. 18). For example, the LED drivers may be assigned to a same zone by default. The zone assignment indicators 322 may be one or more colors. For example, the zone assignment indicators 322 may be the same color when the LED drivers are assigned to the same zone. In the zone assignment mode, the icons 301-306 of the LED drivers (e.g., portions of the icons other than the zone assignment indicators 322) may be adjusted to a neutral color (e.g., gray). The icons 301-306 of the LED drivers may be adjusted to a neutral color to de-emphasize the digital communication links to which the LED drivers may be coupled. The icons 310, 312 representing the digital bus supply devices and/or the icon 314 representing the daylight sensor shown in FIG. 17 may be faded out and/or removed from the canvas 200, as shown in FIG. 18.

Figure 19:
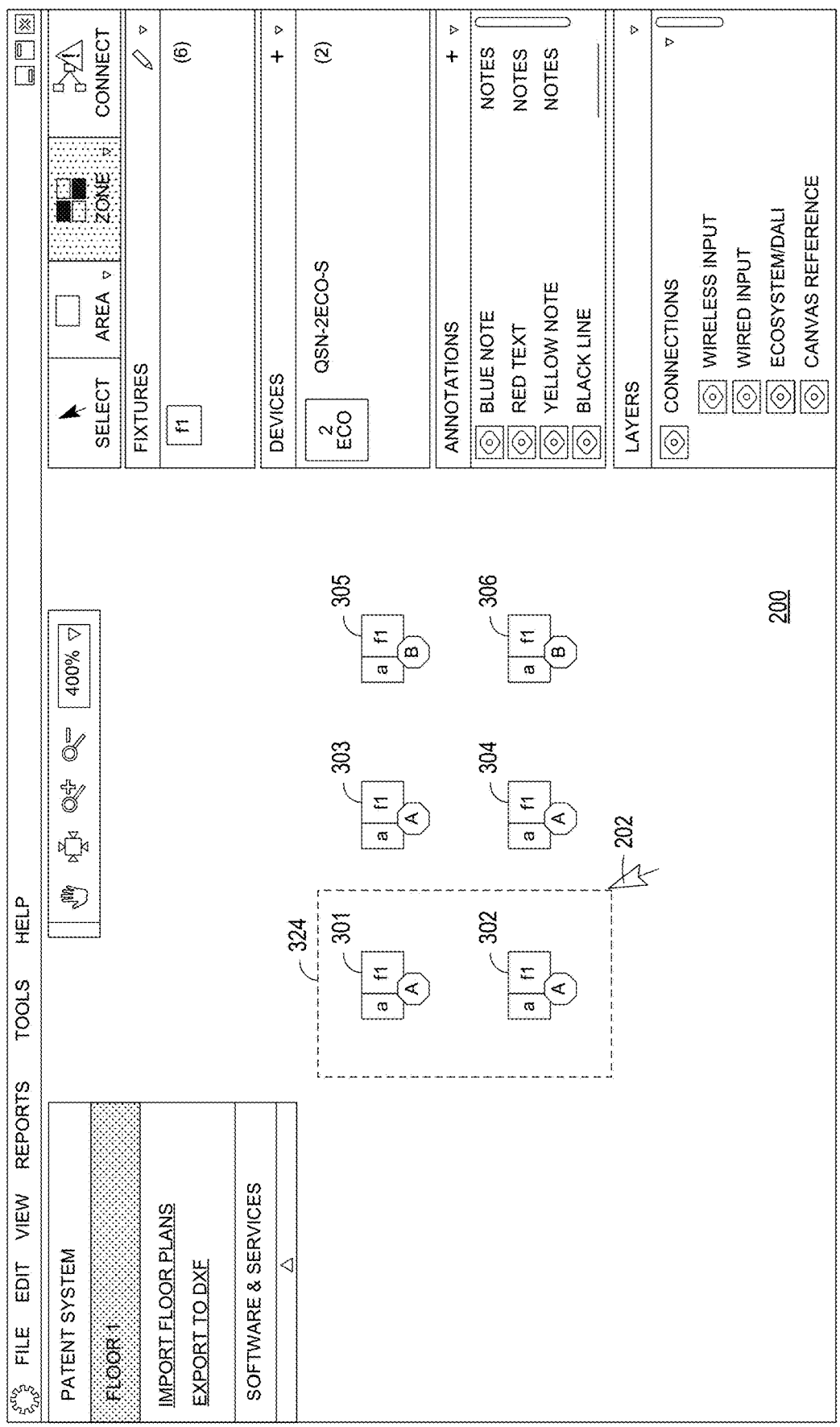
Figure 20:
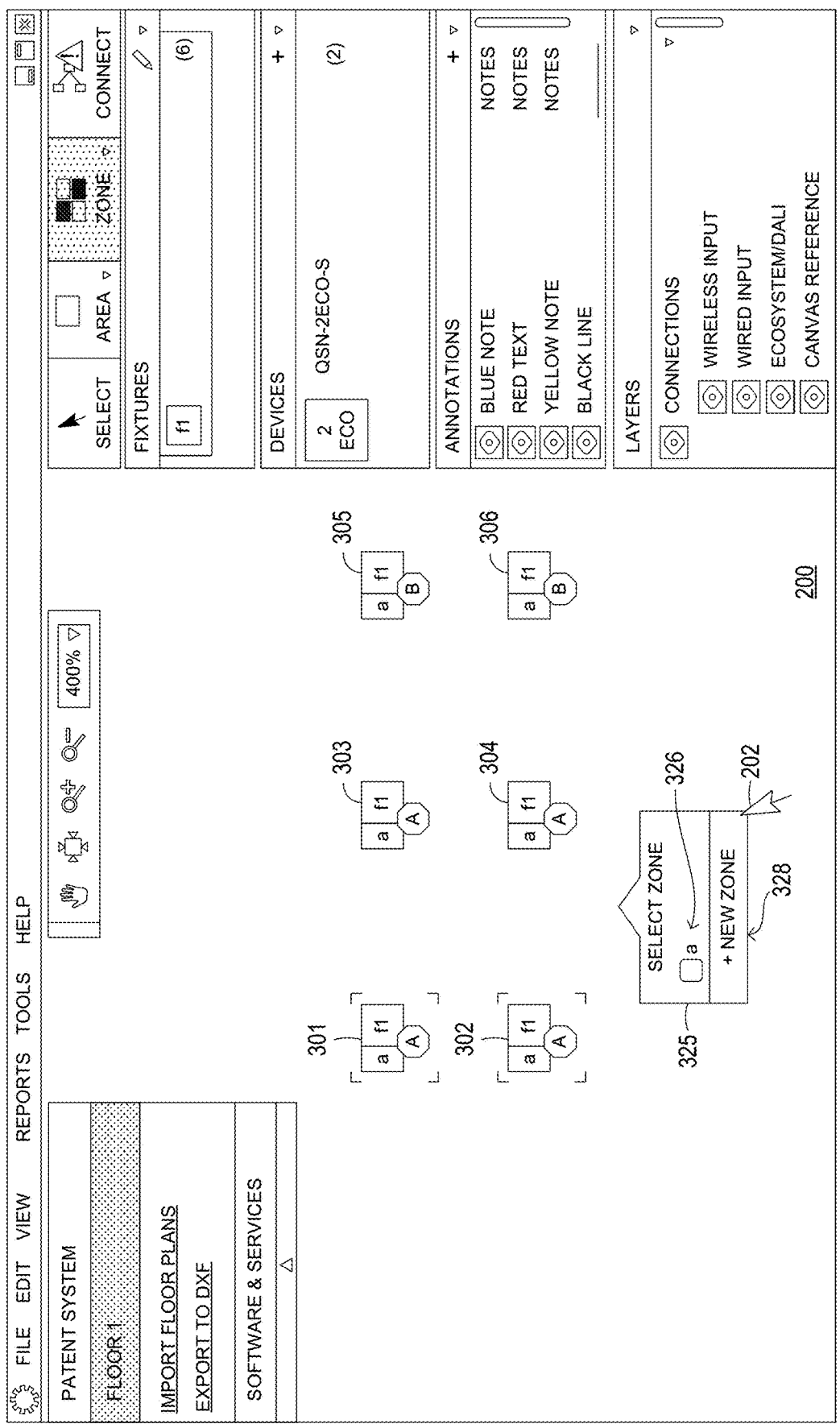
Figure 21:
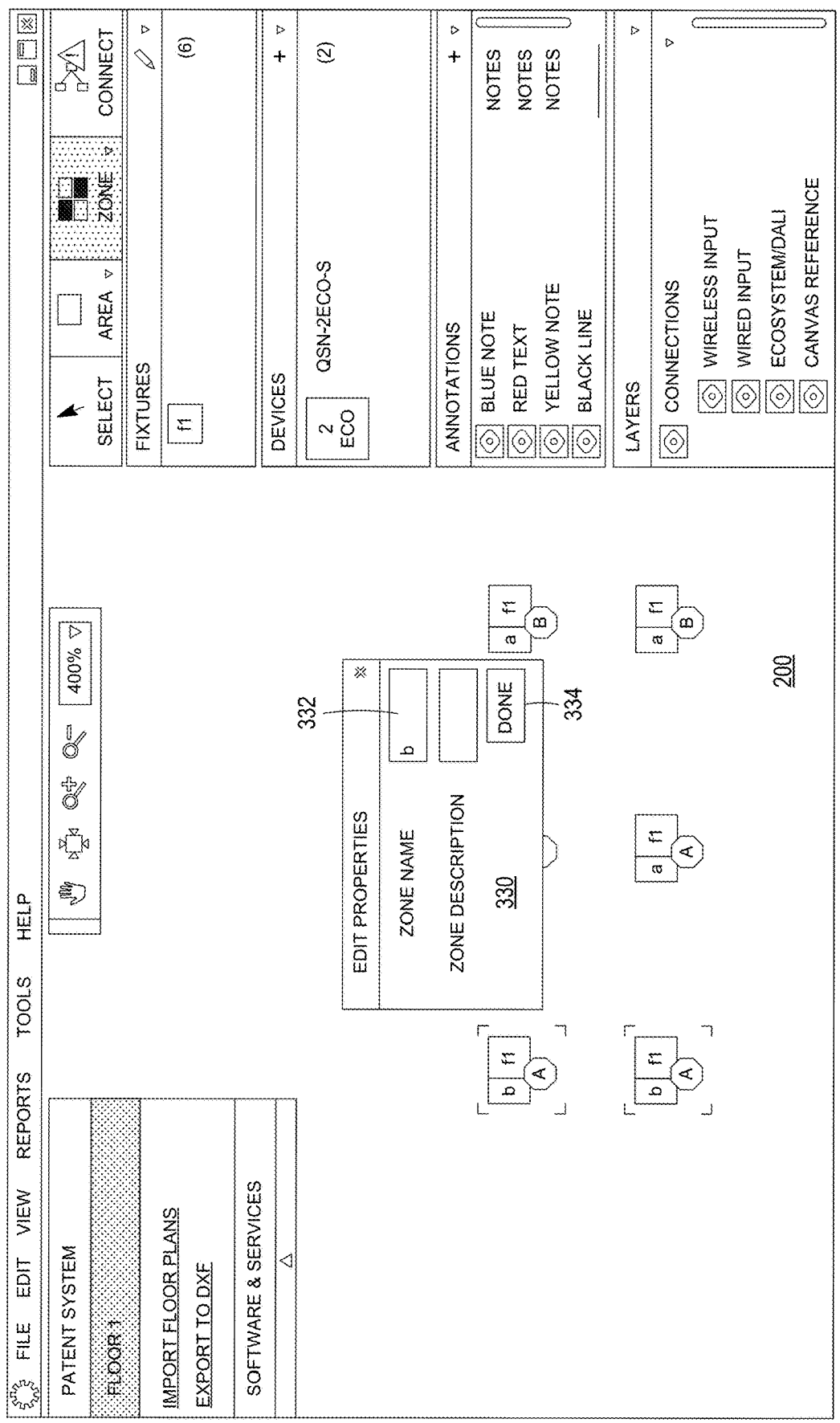
Figure 22:
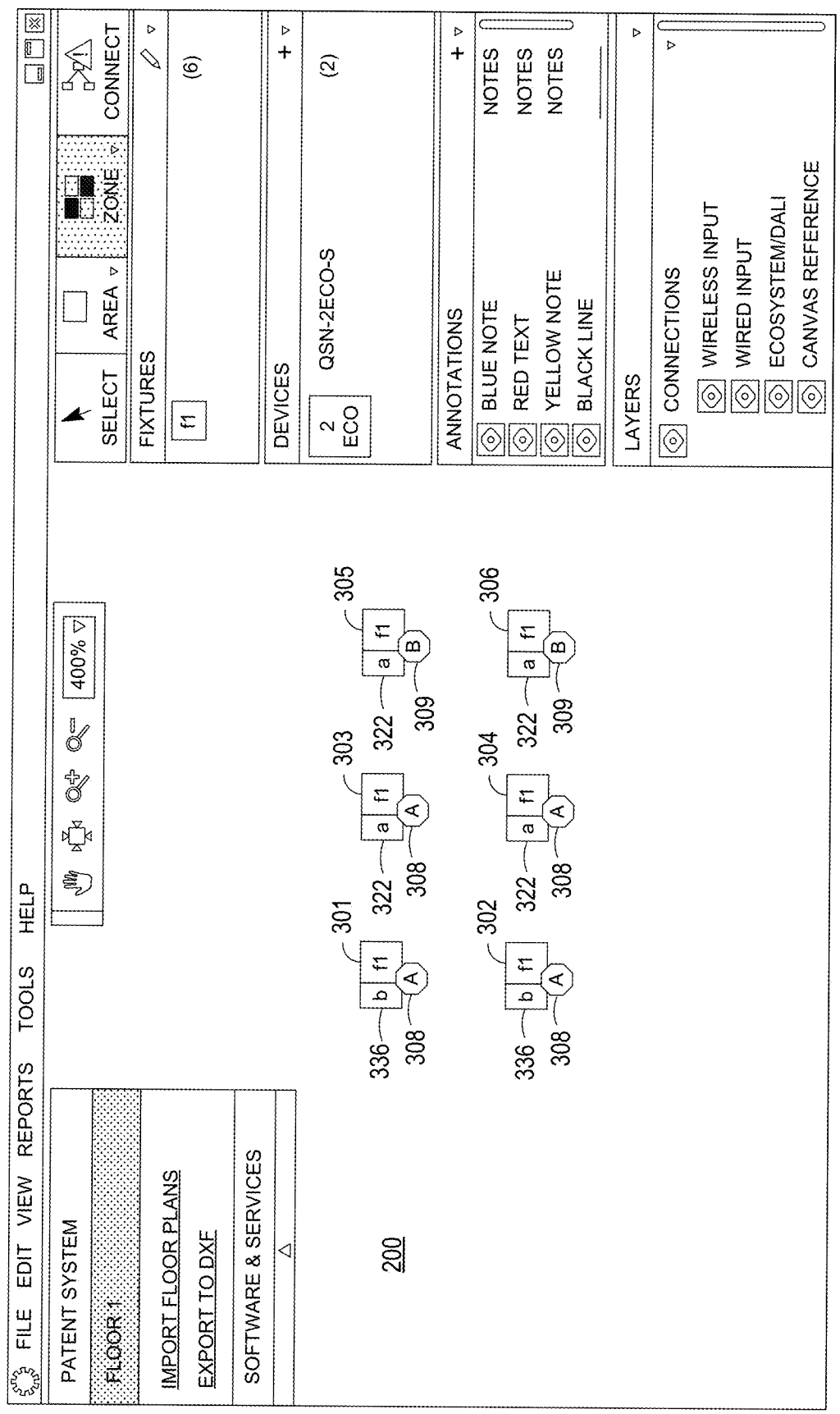

The user may assign the LED drivers represented by the icons 301-306 to one or more zones. For example, as shown in FIG. 19, the user may select one or more of the icons 301-306 by dragging the cursor 202 to generate a selection box 324 surrounding the icons (e.g., icons 301, 302). As shown in FIG. 20, after selecting the icons 301, 302, the design software may display a zone selection window 325. The user may select a zone from a list 326 of zones in the zone selection window 325 (e.g., zone "a," as shown in FIG. 20) or select a "new zone" option 328 to assign the selected LED drivers to a new zone. The design software may display a zone name window 330, as shown in FIG. 21. For example, in response to a selection of the "new zone" option 328 in the zone selection window 325, the design software may display a zone name window 330, as shown in FIG. 21. The design software may display a zone name window 330 to allow the new zone name to be entered into a zone name field 332 (e.g., "b" as shown in FIG. 21). The new zone name entered into the zone name field 332 may be assigned by selecting a button (e.g., a "Done" button 334). As shown in FIG. 22, the icons 301, 302 of the LED drivers assigned to the new zone may be appended with different zone assignment indicators 336 (e.g., indicated by "b"). The zone assignment indicators 336 of the icons 301, 302 may be a same color, and/or a different color, than the zone assignment indicators 322 of the icons 303-306.

Figure 23:
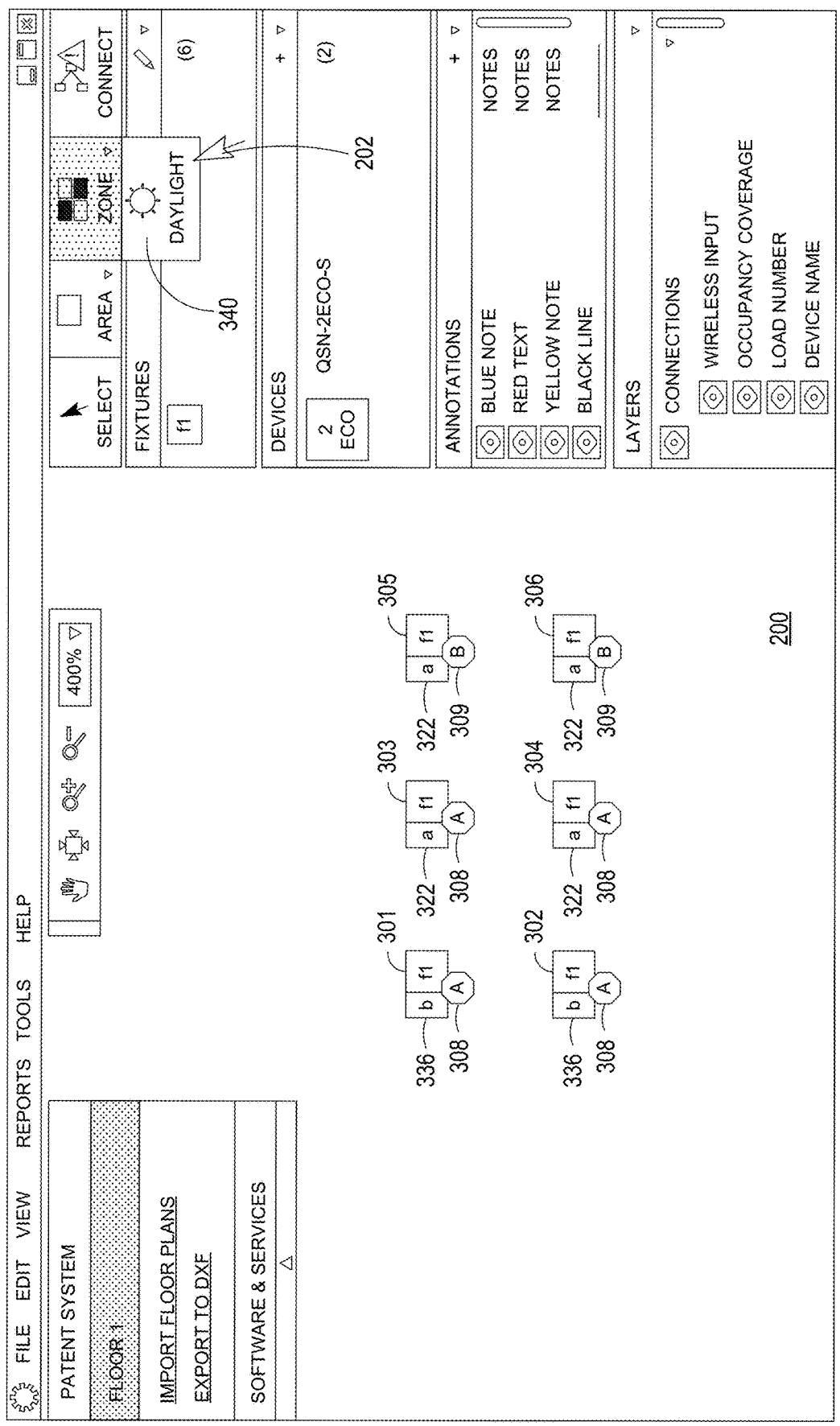
Figure 24:
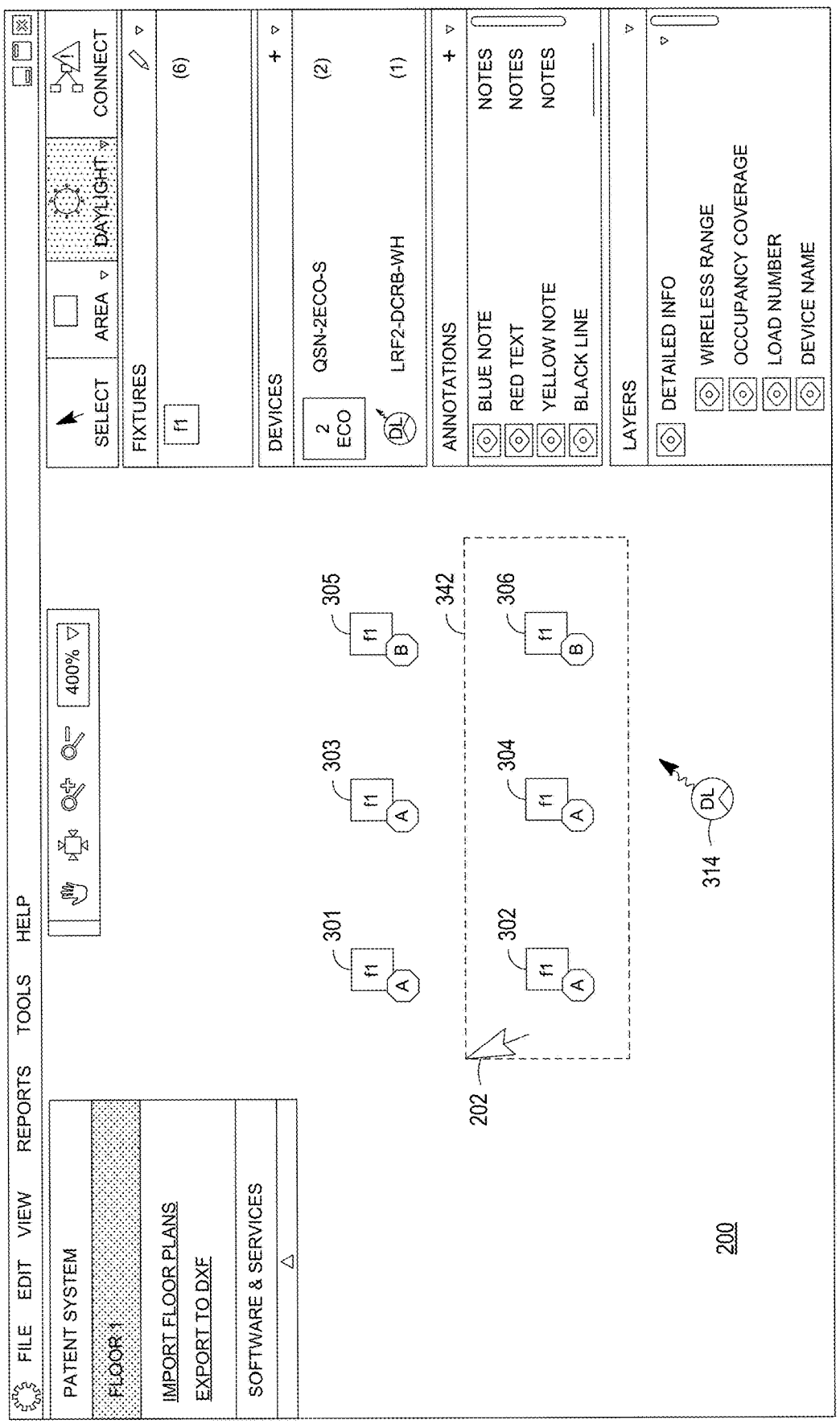
Figure 25:
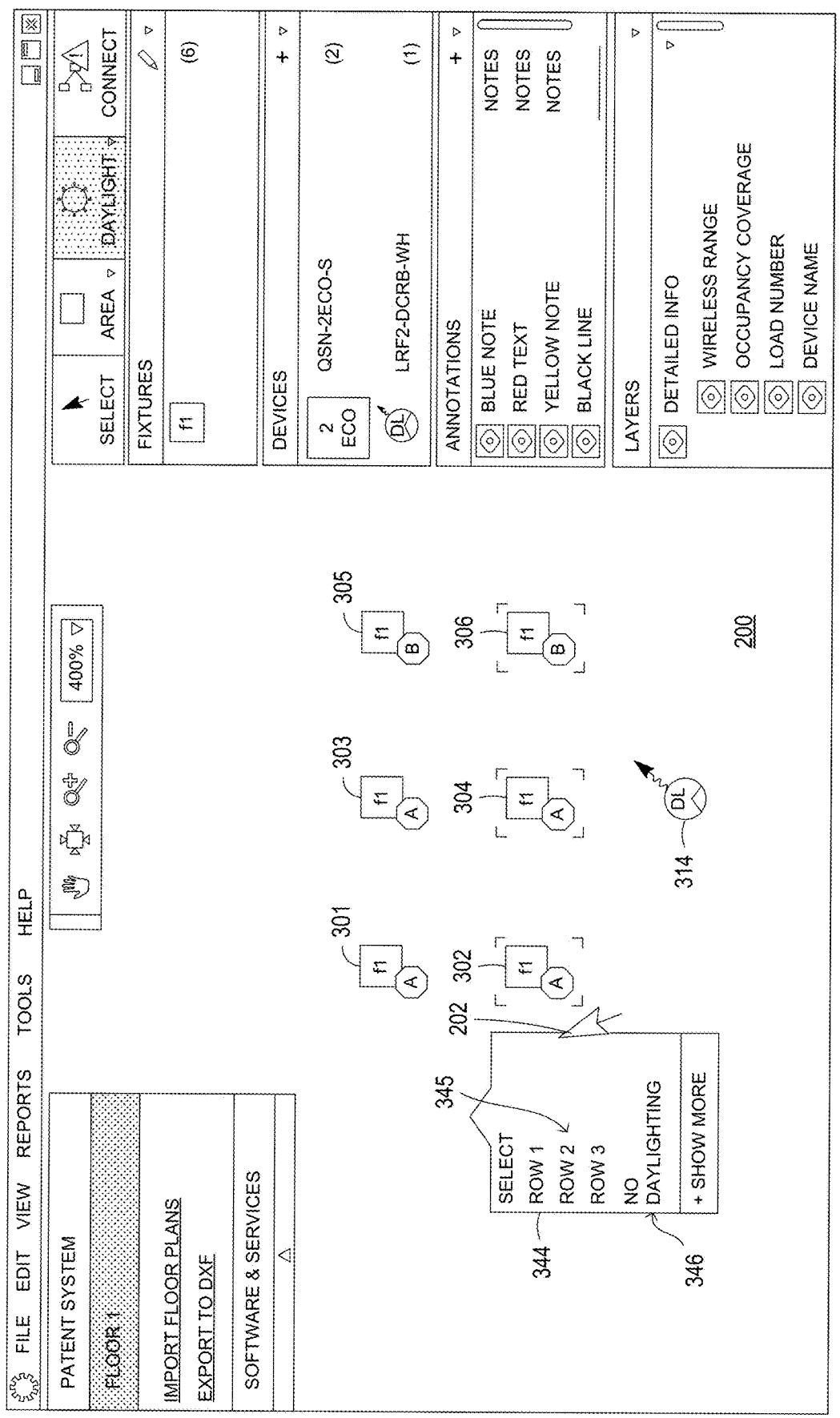

A daylighting zone button may be provided to cause the design software to change to a daylighting zone assignment mode. For example, as shown in FIG. 23, the user may select a daylighting zone button 340 with the cursor 202 to cause the design software to change to a daylighting zone assignment mode. In the daylighting zone assignment mode, as shown in FIG. 24, the design software may show the icon 314 for the daylight sensor on the canvas 200. To assign one or more of the LED drivers to a daylighting zone, the user may select one or more of the icons 301-306 by dragging the cursor 202 to generate a selection box 342 surrounding the icons (e.g., three of the icons 302, 304, 306 as shown in FIG. 24). As shown in FIG. 25, the design software may display a daylighting row selection window 344 having a list 345 of daylighting rows. The user can select a daylighting row to which the LED drivers represented by the icons 302, 304, 306 will be assigned from the list 345 on the daylighting row selection window 344. The daylighting row may be controlled together in a group based on daylighting readings from daylight sensors. If the LED drivers had been assigned to a daylighting row, the user can select a "no daylighting" option 346. After the user selects the "no daylighting"

option, the LED drivers may be unassigned from the previously-assigned daylighting row.

Figure 26:
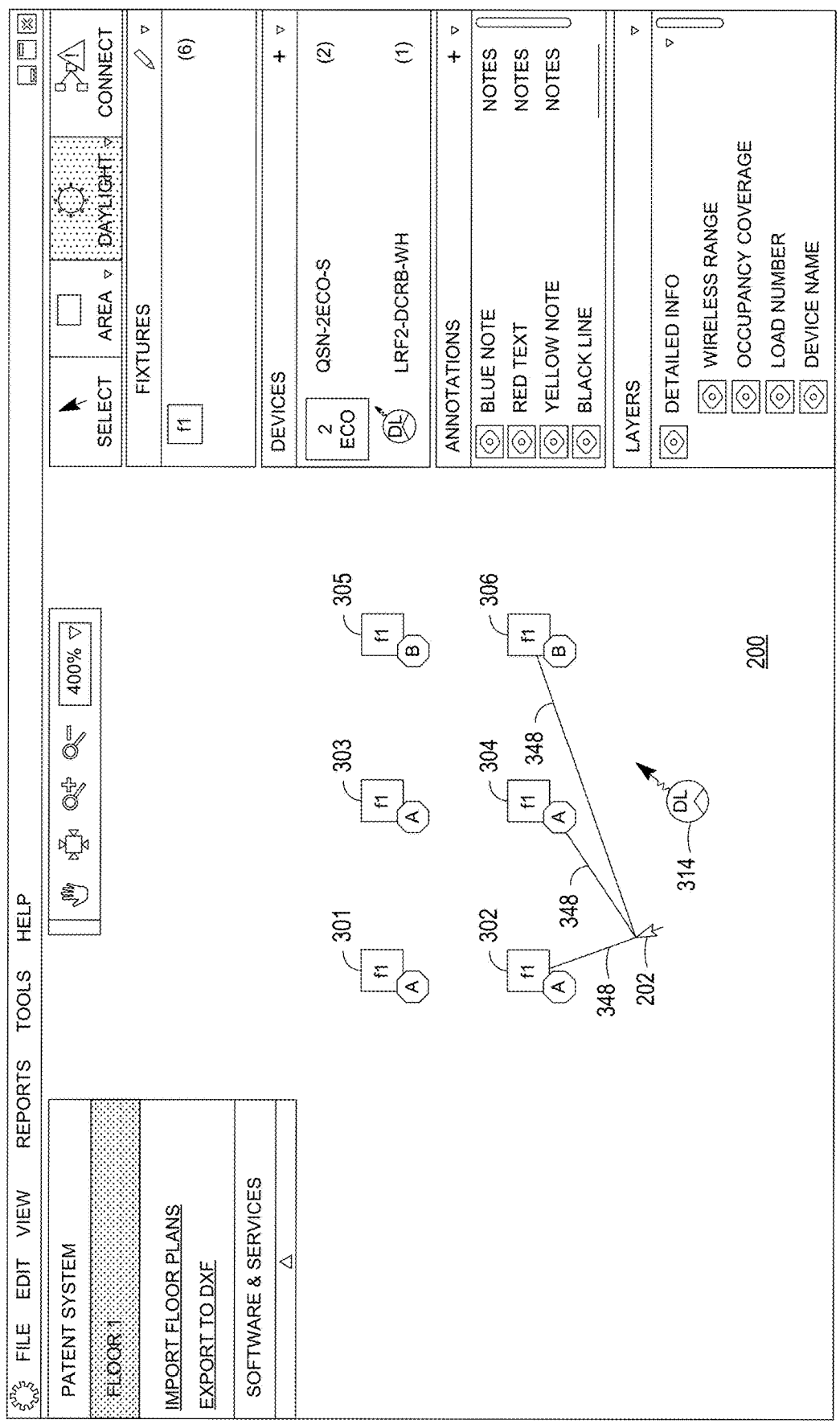
Figure 27:
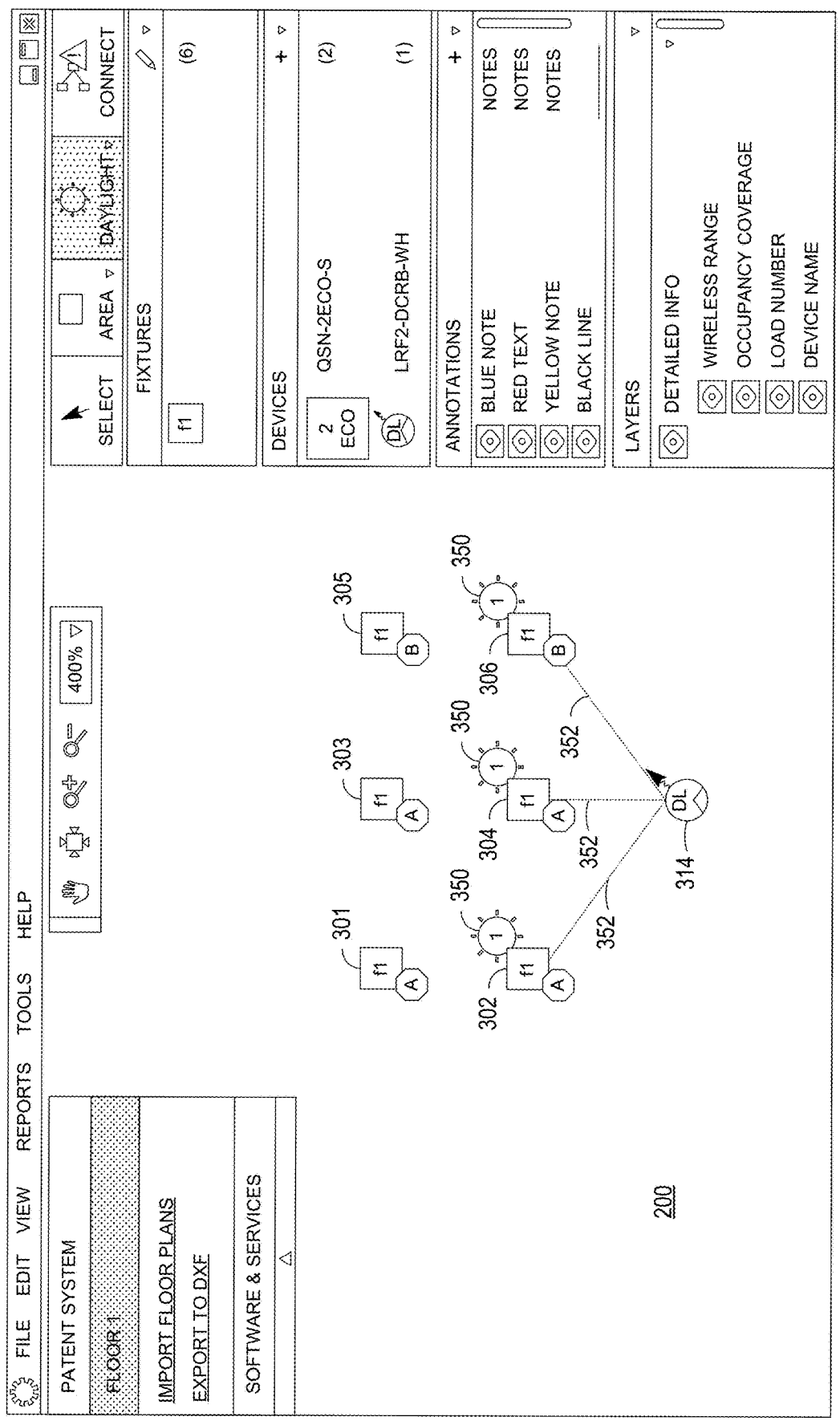

After the user selects one of the daylighting rows (e.g., Row 1) from the list 345 of the daylighting row selection window 344, the design software may generate lines 348 that connect to (e.g., begin at) one or more of the icons 302, 304, 306, as shown in FIG. 26. The lines 348 may connect to (e.g., end at) the cursor 202. The user may select the icon 314 representing the daylight sensor with the cursor 202 to create a relationship (e.g., an association) between the daylight sensor and the LED drivers in the first daylighting row (e.g., the LED drivers represented by the icons 302, 304, 306). As shown in FIG. 27, after the icon 314 representing the daylight sensor is selected, one or more of the icons 302, 304, 306 of the LED drivers in the first daylighting row may be appended with a daylighting row indicator 350. The daylighting row indicators 350 may take different form factors. For example, the daylight row indicators 350 may look like an image of the sun, may be yellow, etc. The daylighting row indicators 350 may include a number signifying the daylighting row to which the LED drivers are assigned. The design software may display lines having one or more appearances (e.g., weights, dashes, arrows, etc.). For example, the design software may display dotted lines 352 between the icons 302, 304, 306 of the LED drivers in the first daylighting row and the icon 314 representing the daylight sensor.

Figure 28:
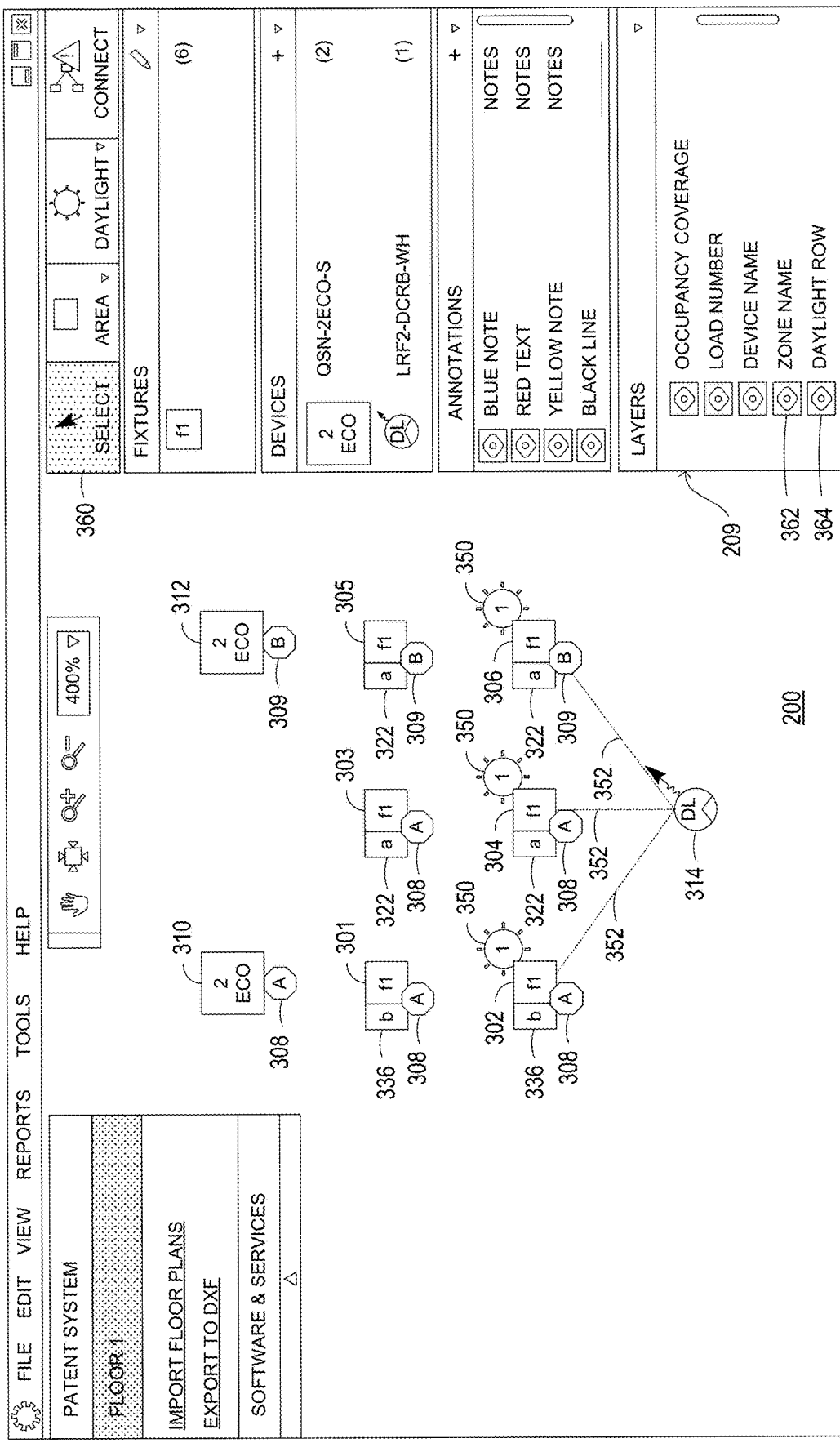
Figure 29:
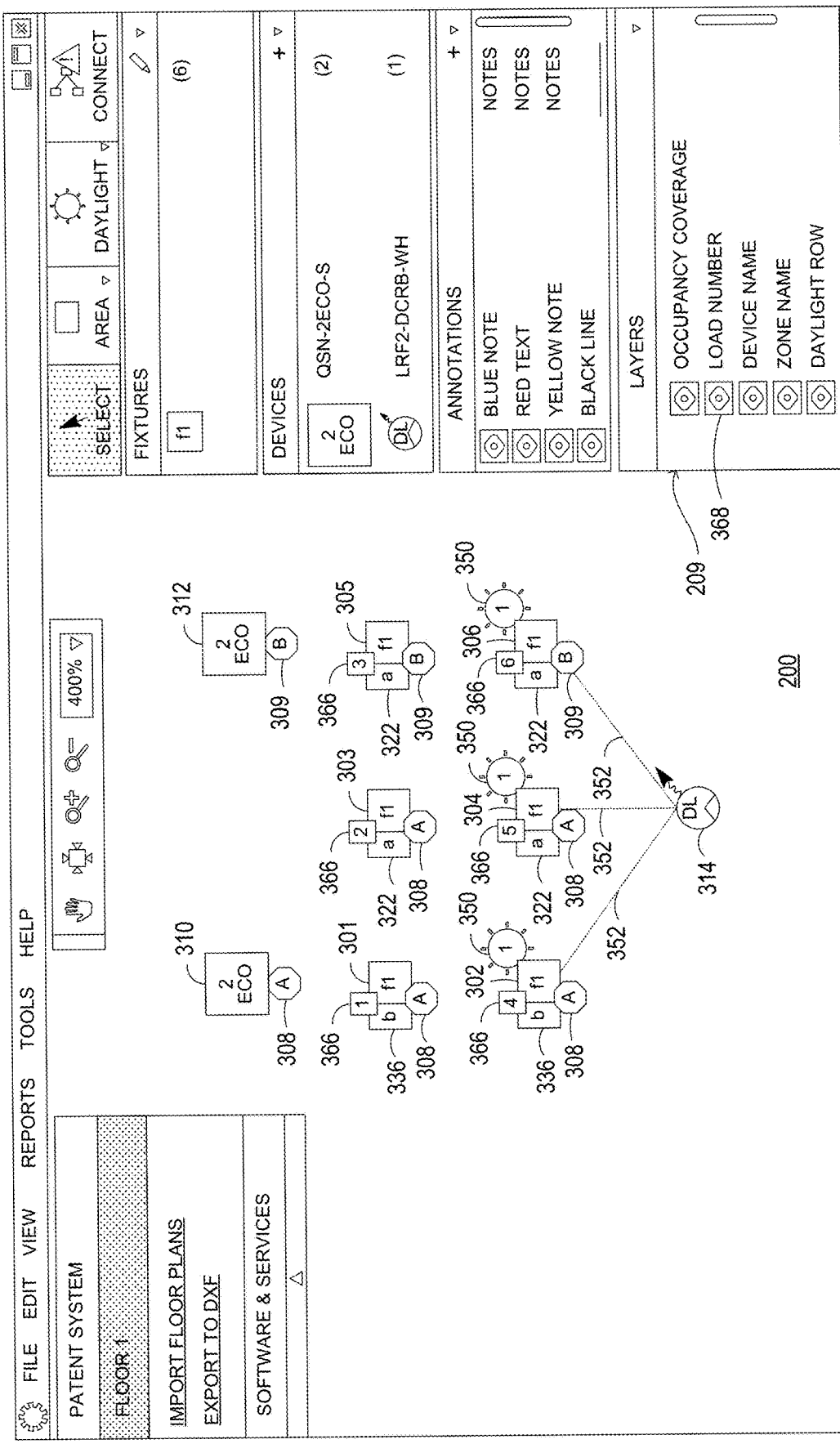

The user may exit the zone assignment mode and/or the daylighting assignment mode. For example, as shown in FIG. 28, the user may exit the zone assignment mode and/or the daylighting assignment mode by selecting a select button 360. The user may select a zone name layer 362 and/or a daylighting row layer 364 from the layers window 209 of the palette column 205 to cause the design software to append the zone assignment indicators 322, 336 and the daylighting row indicators 350 onto the icons 301-306, as shown in FIG. 28. As shown in FIG. 29, the icons 301-306 may be appended with a load number indication 366 in response to the selection of a load number layer 368 from the layers window 209 of the palette column 205. The load number indication 366 may include a unique number for one or more fixtures in an area.

The design software may be configured to display specified and/or rated ranges (e.g., occupancy ranges) for one or more occupancy and/or vacancy sensors on the canvas 200. FIGS. 30-33 illustrate example graphical representations of a user interface that may be displayed on the visual display of the network device by the design software for displaying specified occupancy sensor ranges for various occupancy and/or vacancy sensors.

Figure 30:
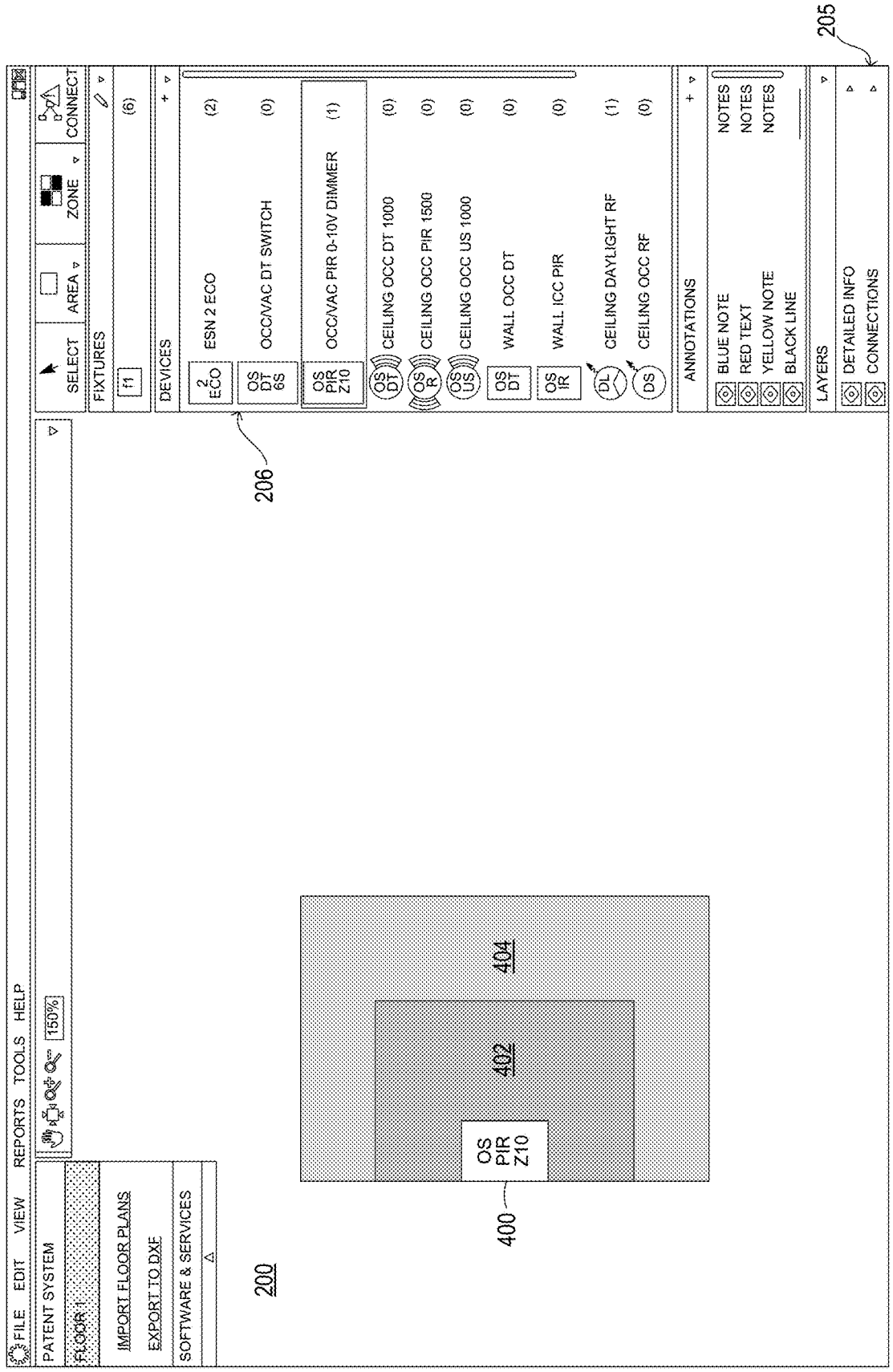
FIGS. 30-33 illustrate example graphical representations of a user interface that may be displayed on the visual display of the network device by the design software for displaying specified occupancy sensor ranges for various occupancy and vacancy sensors.

For example, as shown in FIG. 30, if a wall-mounted passive-infrared (PIR) occupancy sensor dimmer is selected from the devices window 206 of the palette column 205, the canvas 200 may display a first occupancy sensor icon 400 representing the wall-mounted PIR occupancy sensor dimmer. The PIR occupancy sensor circuitry of the wall-mounted PIR occupancy sensor dimmer may be characterized by a first specified occupancy sensor range 402 and/or a second specified occupancy sensor range 404. The first specified occupancy sensor range 402 and/or the second specified occupancy sensor range 404 may be displayed on the canvas 200 in relation to the first occupancy sensor icon 400. For example, the first specified occupancy sensor range 402 may represent a minor motion occupancy sensor range in which detection of minor motions of an occupant (e.g., hands moving) may be detected, and the second specified occupancy sensor range 404 may represent a major motion occupancy sensor range in which detection of major motions of an occupant (e.g., an occupant walking) may be detected. The second specified occupancy sensor range 404 may be larger than the first specified occupancy sensor range 402 and/or the second specified occupancy sensor range 404 may encompass the first specified occupancy sensor range 402, as shown in FIG. 30. The first specified occupancy sensor range 402 and the second specified occupancy sensor range 404 may be represented on the canvas 200 as different colors and/or different shades of the same color. The first occupancy sensor icon 400 may be moved and/or rotated. For example, when a floorplan is provided on the canvas 200, the first occupancy sensor icon 400 may be moved and/or rotated to ensure that the desired occupancy sensor coverage is achieved.

Figure 31:
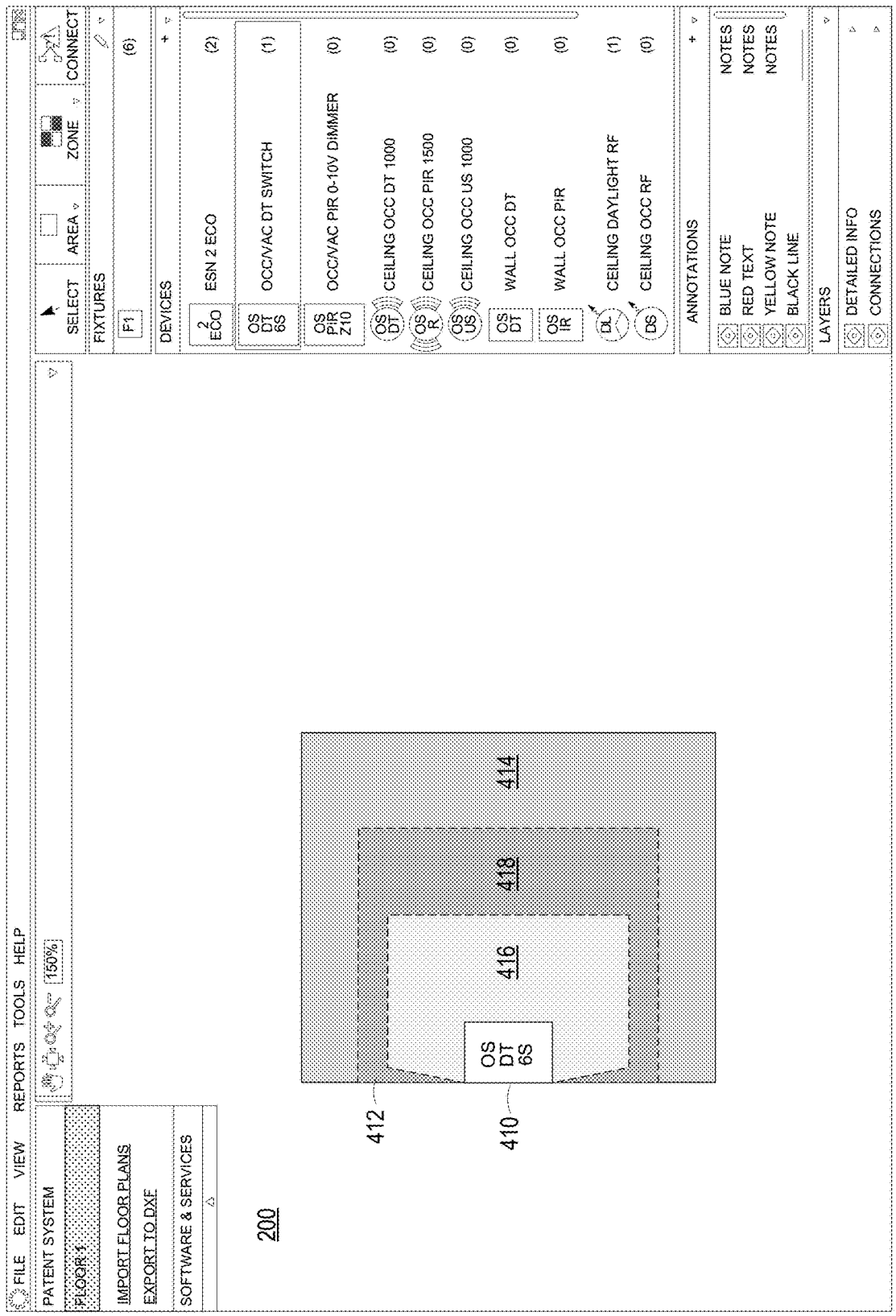

The user may select a wall-mounted dual-tech occupancy sensor switch from the devices window 206 of the palette column 205. For example, the user may select a wall-mounted dual-tech occupancy sensor switch from the devices window 206 of the palette column 205 to cause the canvas 200 to display a second occupancy sensor icon 410 representing the wall-mounted dual-tech occupancy sensor switch, as shown in FIG. 31. The wall-mounted dual-tech occupancy sensor switch may include PIR occupancy sensor circuitry and/or ultrasonic occupancy sensor circuitry. The PIR occupancy sensor circuitry of the wall-mounted dual-tech occupancy sensor switch may be characterized by a first specified occupancy sensor range 412 (e.g., a minor motion occupancy sensor range) and/or a second specified occupancy sensor range 414 (e.g., a major motion occupancy sensor range) that may be displayed on the canvas 200 in relation to the second occupancy sensor icon 410. The ultrasonic occupancy sensor circuitry of the wall-mounted dual-tech occupancy sensor switch may be characterized by a third specified occupancy sensor range 416 (e.g., a minor motion occupancy sensor range) and/or a fourth specified occupancy sensor range 418 (e.g., a major motion occupancy sensor range) that may be displayed on the canvas 200 in relation to the second occupancy sensor icon 410. The first specified occupancy sensor range 412 and/or the second specified occupancy sensor range 414 may be represented on the canvas 200 as different shades of a first color (e.g., purple), and/or the third and/or fourth specified occupancy sensor ranges 416, 418 may be represented on the canvas 200 as different shades of a second color (e.g., yellow).

Figure 32:
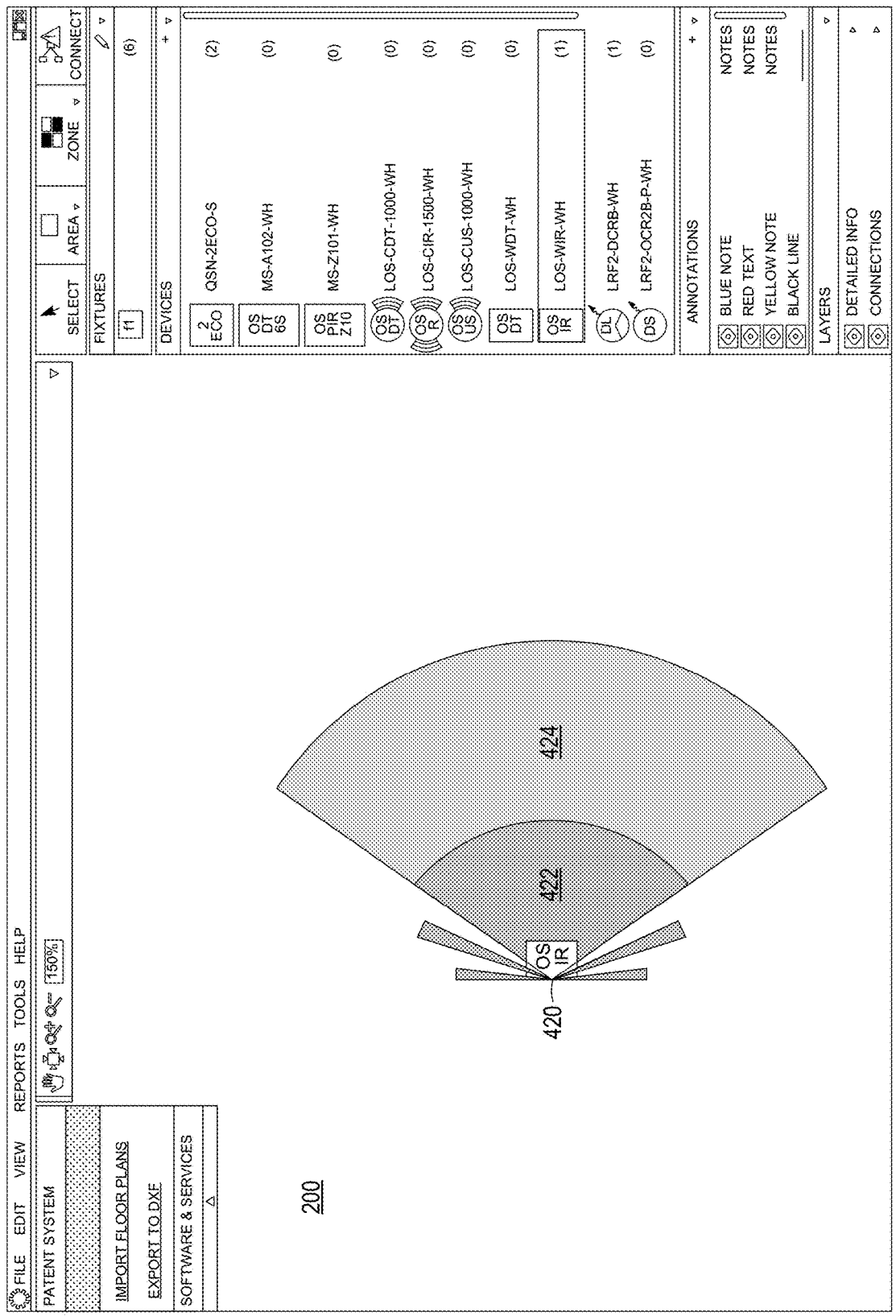

As shown in FIG. 32, the canvas 200 may display a third occupancy sensor icon 420. The third occupancy sensor icon 420 may represent a wall-mounted PIR occupancy sensor. The PIR occupancy sensor circuitry of the wall-mounted PIR occupancy sensor may be characterized by a first specified occupancy sensor range 422 (e.g., a minor motion occupancy sensor range) and/or a second specified occupancy sensor range 424 (e.g., a major motion occupancy sensor range) that may be displayed on the canvas 200 in relation to the third occupancy sensor icon 420.

Figure 33:
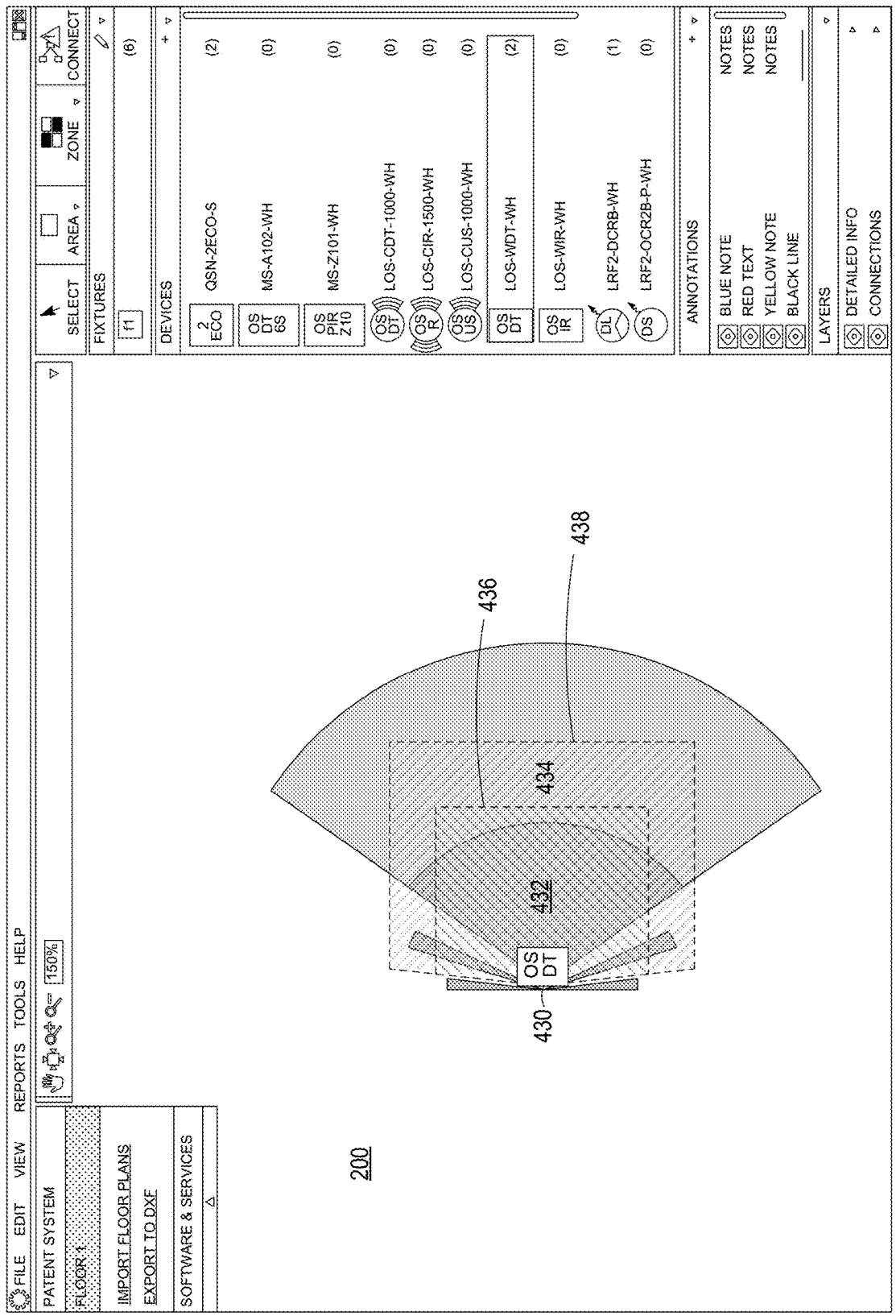

As shown in FIG. 33, the canvas 200 may display a fourth occupancy sensor icon 430. The fourth occupancy sensor icon 430 may represent a wall-mounted dual-tech occupancy sensor. The PIR occupancy sensor circuitry of the wall-mounted dual-tech occupancy sensor may be characterized by a first specified occupancy sensor range 432 (e.g., a minor motion occupancy sensor range) and/or a second specified occupancy sensor range 434 (e.g., a major motion occupancy sensor range) that may be displayed on the canvas 200 in relation to the fourth occupancy sensor icon 430. The ultrasonic occupancy sensor circuitry of the wall-mounted dual-tech occupancy sensor may be characterized by a third specified occupancy sensor range 436 (e.g., a minor motion occupancy sensor range) and/or a fourth specified occupancy sensor range 438 (e.g., a major motion occupancy sensor range) that may be displayed on the canvas 200 in relation to the fourth occupancy sensor icon 430.

While the design software shown in FIGS. 2-33 has been described herein for use with configuring a load control system, the design software may also be used for designing the load control system. For example, the design software may be used for designing the load control system before sale of the load control system and/or for the purpose of generating a quote for the load control system.

Figure 34:
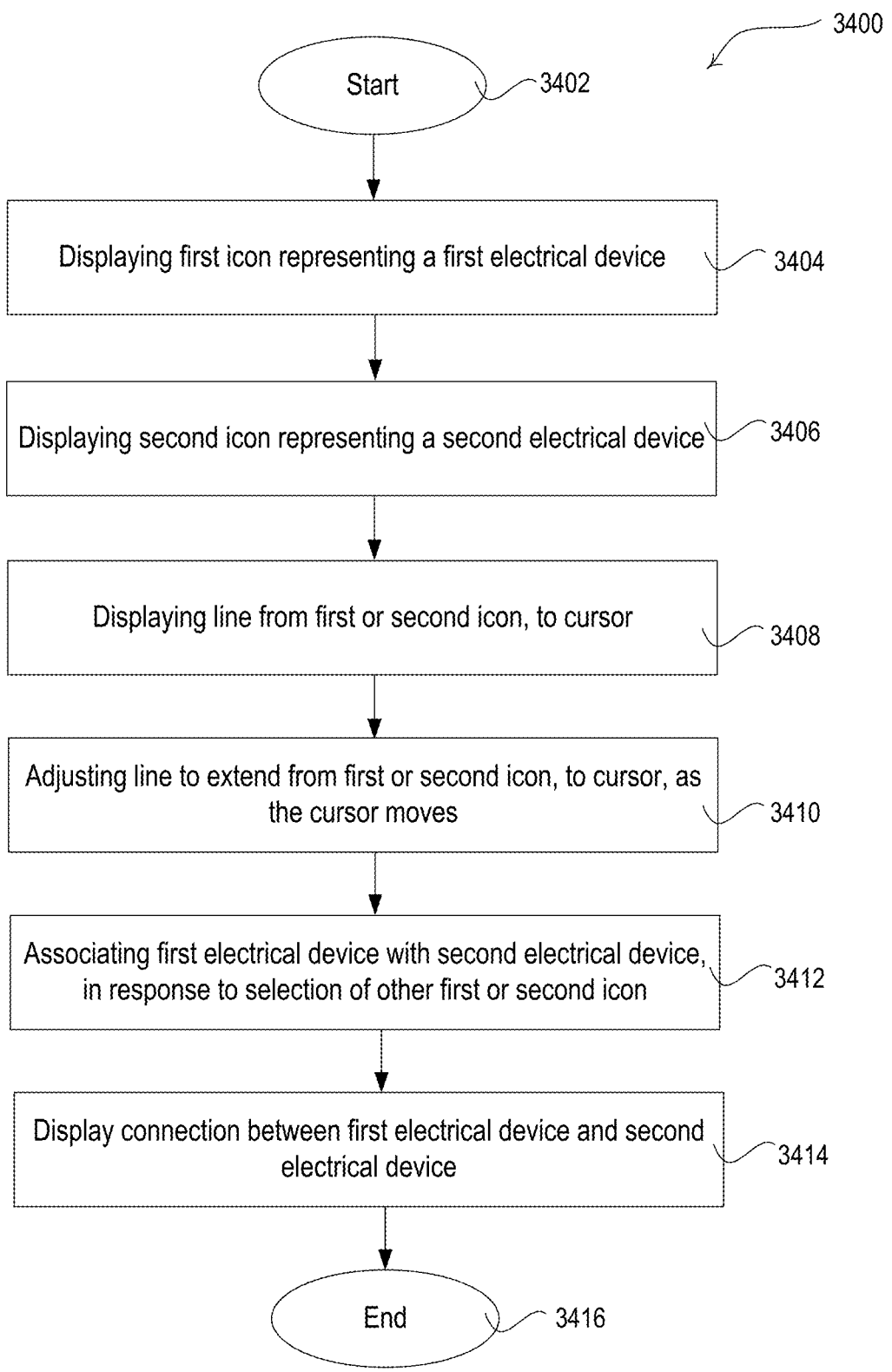
FIGS. 34-35 show flowcharts of example configurations of a load control system using a graphical user interface software.

FIG. 34 is a flow diagram of an example method 3400 for configuring a load control system using a graphical user interface software (e.g., the design software). The method 3400 may be performed by one or more network devices in a load control system, such as the load control system 102 shown in FIG. 1. The method 3400 may be performed on a single device, or may be distributed across multiple devices. For example, the method 3400, or portions thereof, may be performed by one or more network devices, such as personal computers (PCs), laptops, tablets, smart phones, servers, or equivalent devices having access to a visual display.

The method 3400 may begin at 3402. At 3404, the design software may display (e.g., display via a GUI) a first icon (such as first icon 210, shown on FIG. 2) representing a first electrical device. The first electrical device may be a control-target device, such as a sensor module or a load control device. The first electrical device may be an electrical load, such as a lighting load. The first icon may be displayed on a canvas, such as canvas 200 shown in FIG. 2. The first icon may be selected from a devices window, such as devices window 206.

The design software may display one or more icons on the canvas. For example, at 3406, the design software may display a second icon (such as second icon 212, shown on FIG. 2) representing a second electrical device. The second electrical device may be a control-source device, such as an occupancy sensor. The second electrical device may be a load control device, such as a dimmer switch, for controlling the electrical load. At 3408, a line may be displayed from the first icon and/or the second icon. For example, the line may be displayed from the first icon and/or the second icon to a cursor. At 3410, the line may adjust from the first icon and/or the second icon, to the cursor, as the cursor moves.

At 3412, a relationship (e.g., an association) may be made between the first electrical device (e.g., the first icon 210) and the second electrical device (e.g., the second icon 212). For example, an association may be made between the first electrical device and the second electrical device by drawing a line between the first icon and the second icon on the canvas. The first icon may be selected with the cursor (e.g., by actuating a button on a mouse). The first end of the line may remained anchored at the first icon. The second icon may be selected with the cursor (e.g., by actuating a button on the mouse) to create an association between the first electrical device (e.g., the first icon 210) and the second electrical device (e.g., the second icon 212). At 3414, the connection between the first electrical device and the second electrical device may be displayed. For example, a static line or badge may be displayed to identify the connection between the devices. The method 3400 may end at 3416.

Figure 35:
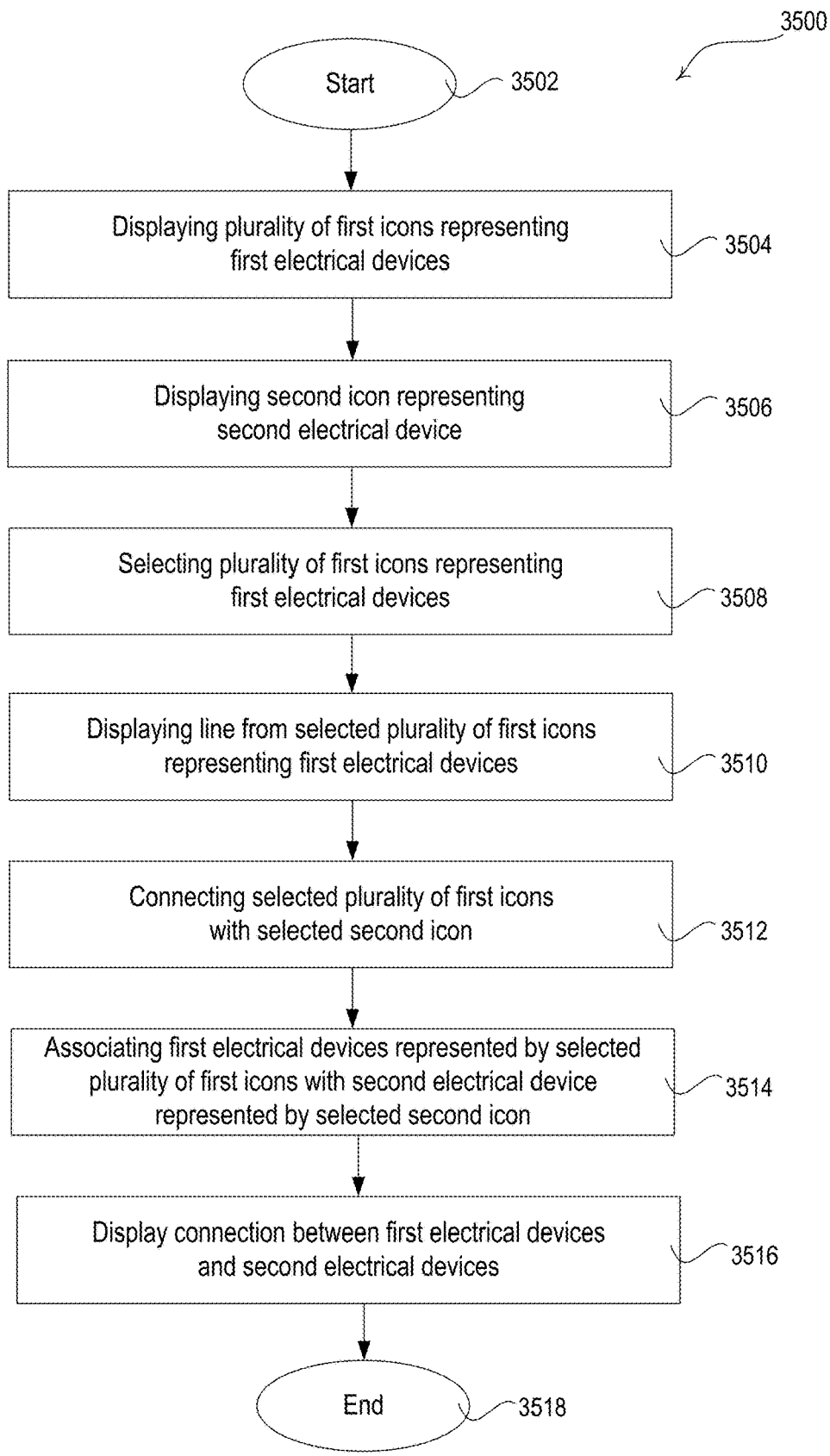

FIG. 35 is a flow diagram of an example method 3500 for configuring a load control system using a graphical user interface software (e.g., the design software). The method 3500 may be performed by one or more network devices in a load control system, such as the load control system 102 shown in FIG. 1. The method 3500 may be performed on a single device, or may be distributed across multiple devices. For example, the method 3500, or portions thereof, may be performed by one or more network devices, such as personal computers (PCs), laptops, tablets, smart phones, servers, or equivalent devices having access to a visual display.

The method 3500 may begin at 3502. At 3504, the design software may display (e.g., display via a GUI) one or more first icons (such as first icon 272, shown on FIG. 15) representing one or more first electrical devices. The first electrical devices may be control-target devices, such as a sensor module or a load control device. The first electrical devices may be electrical loads, such as a lighting load. The first icon may be displayed on a canvas, such as canvas 200 shown in FIG. 15. The first icon may be selected from a devices window.

At 3506, the design software may display a second icon (such as second icon 270, shown on FIG. 15) representing a second electrical device. The second electrical device may be a control-source device, such as an occupancy sensor. The second electrical device may be a load control device, such as a dimmer switch, for controlling the electrical load. At 3508, one or more of the first icons representing one or more first electrical devices may be selected. The one or more of the first icons may be selected via a cursor and/or another known selection technique. At 3510, one or more lines may be displayed from the one or more first icons. For example, as shown in FIG. 15, a line may be displayed from one or more of the first icons. The one or more lines may adjust from the first icons, to the cursor, as the cursor moves.

At 3512, a line may connect the one or more first electrical devices (e.g., represented by the one or more first icons) with the second electrical device (e.g., represented by the second icon). The line may connect the one or more first electrical devices with the second electrical device after the second icon representing a second electrical device is selected. At 3514, a relationship (e.g., an association) between the one or more first electrical devices and the second electrical device may be formed. For example, the user may make an association between the one or more first electrical devices and the second electrical device by drawing a line between the one or more first icons and the second icon. The user may select one or more of the first icons with the cursor (e.g., by actuating a button on a mouse). The user may select the second icon with the cursor (e.g., by actuating a button on the mouse) to create an association between the one or more first electrical devices (such as 272, shown on FIG. 15) and the second electrical devices (such as 270, shown on FIG. 15). At 3516, the connection between the first electrical devices and the second electrical devices may be displayed. For example, a static line or badge may be displayed to identify the connection between the devices. The method 3500 may end at 3516.

Figure 36:
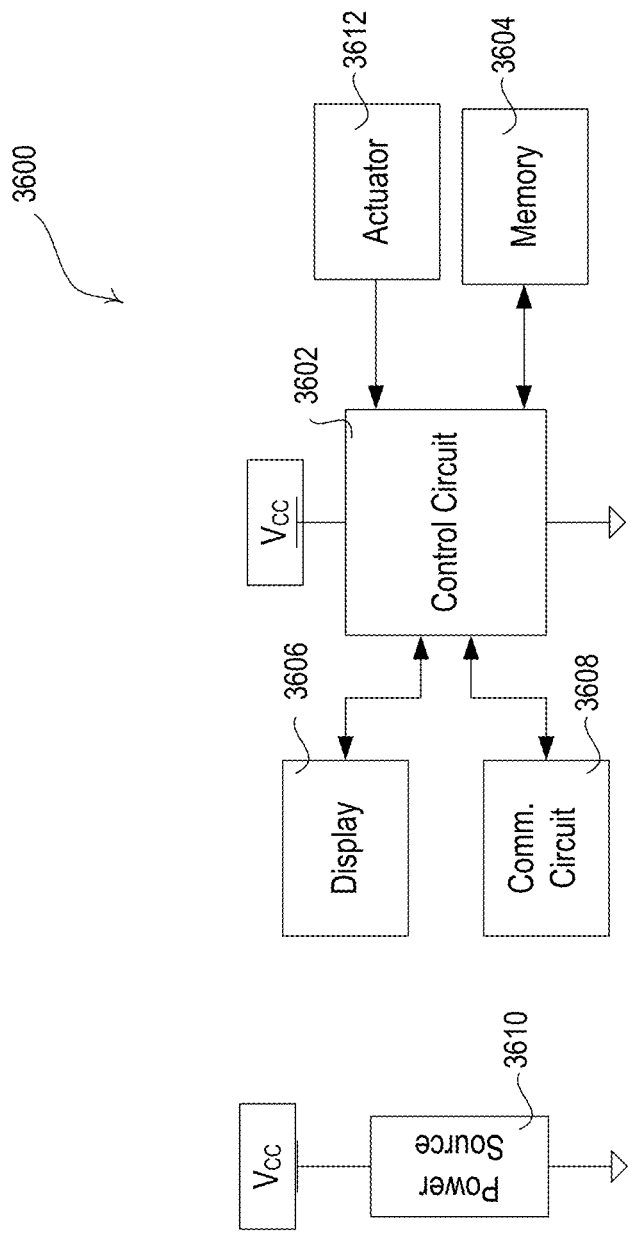
FIG. 36 is a block diagram of an example programming device.

FIG. 36 is a block diagram illustrating an example network device 3600 as described herein. For example, the network device 3600 may be the computer 144. The network device 3600 may include a control circuit 3602 for controlling the functionality of the network device 3600. The control circuit 3602 may include one or more general purpose processors, special purpose processors, conventional processors, digital signal processors (DSPs), microprocessors, integrated circuits, a programmable logic device (PLD), application specific integrated circuits (ASICs), or the like. The control circuit 3602 may perform signal coding, data processing, power control, input/output processing, or any other functionality that enables the network device 3600 to perform as described herein. The control circuit 3602 may store information in and/or retrieve information from the memory 3604. The memory 3604 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 3600 may include a communications circuit 3608 for transmitting and/or receiving information. The communications circuit 3608 may perform wireless and/or wired communications. The communications circuit 3608 may include an RF transceiver or other circuit capable of performing wireless communications via an antenna. Communications circuit 3608 may be in communication with control circuit 3602 for transmitting and/or receiving information.

The control circuit 3602 may be in communication with a display 3606 for providing information to a user. The processor 3602 and/or the display 3606 may generate GUIs for being displayed on the network device 3600. The display 3606 and the control circuit 3602 may be in two-way communication, as the display 3606 may include a touch screen module capable of receiving information from a user and providing such information to the control circuit 3602. The network device 3600 may include an actuator 3612 (e.g., one or more buttons) that may be actuated by a user to communicate user selections to the control circuit 3602.

Each of the modules within the network device 3600 may be powered by a power source 3610. The power source 3610 may include an AC power supply or DC power supply, for example. The power source 3610 may generate a supply voltage $V_{CC}$ for powering the modules within the network device 3600.

Figure 37:
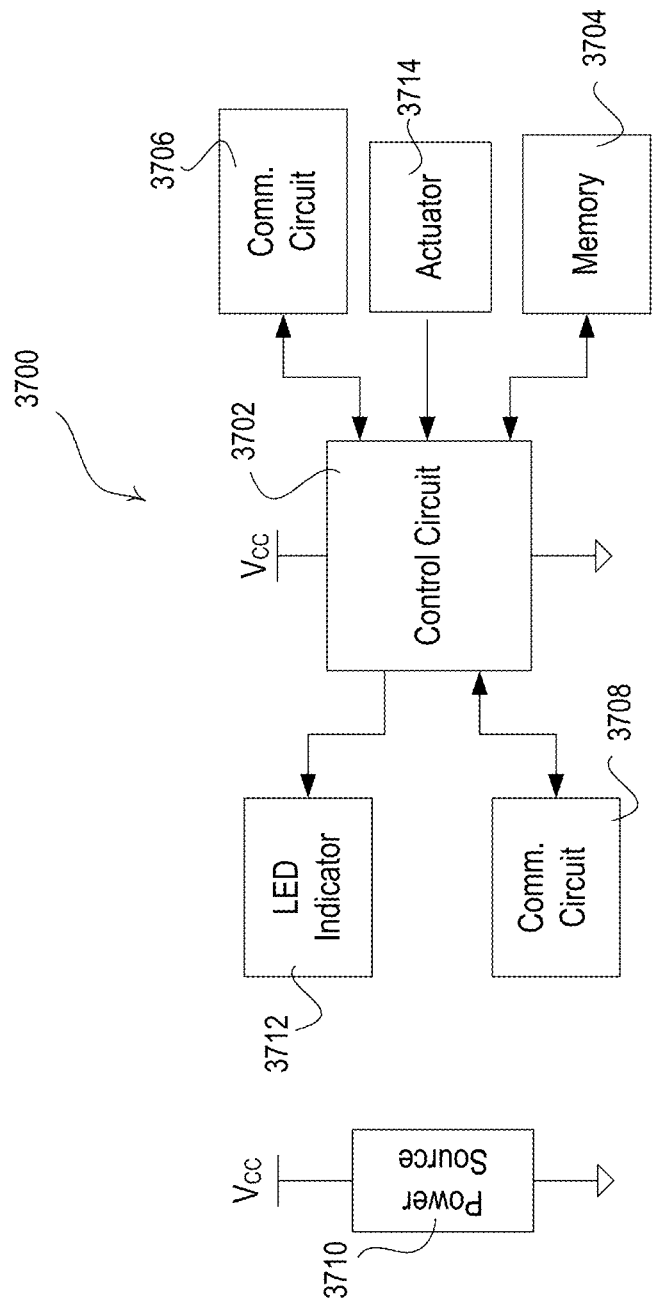
FIG. 37 is a block diagram of an example system controller.

FIG. 37 is a block diagram illustrating an example system controller 3700 (such as system controller 150, described herein). The system controller 3700 may include a control circuit 3702 for controlling the functionality of the system controller 3700. The control circuit 3702 may include one or more general purpose processors, special purpose processors, conventional processors, digital signal processors (DSPs), microprocessors, integrated circuits, a programmable logic device (PLD), application specific integrated circuits (ASICs), or the like. The control circuit 3702 may perform signal coding, data processing, power control, input/output processing, or any other functionality that enables the system controller 3700 to perform as described herein. The control circuit 3702 may store information in and/or retrieve information from the memory 3704. The memory 3704 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 3700 may include a communications circuit 3706 for transmitting and/or receiving information. The communications circuit 3706 may perform wireless and/or wired communications. The system controller 3700 may also, or alternatively, include a communications circuit 3708 for transmitting and/or receiving information. The communications circuit 3706 may perform wireless and/or wired communications. Communications circuits 3706 and 3708 may be in communication with control circuit 3702. The communications circuits 3706 and 3708 may include RF transceivers or other communications modules capable of performing wireless communications via an antenna. The communications circuit 3706 and communications circuit 3708 may be capable of performing communications via the same communication channels or different communication channels. For example, the communications circuit 3706 may be capable of communicating (e.g., with a programming device, over a network, etc.) via a wireless communication channel (e.g., BLUETOOTH®, near field communication (NFC), WIFI®, WI-MAX®, cellular, etc.) and the communications circuit 3708 may be capable of communicating (e.g., with control devices and/or other devices in the load control system) via another wireless communication channel (e.g., WI-FI® or a proprietary communication channel, such as CLEAR CONNECT™).

The control circuit 3702 may be in communication with an LED indicator 3712 for providing indications to a user. The control circuit 3702 may be in communication with an actuator 3714 (e.g., one or more buttons) that may be actuated by a user to communicate user selections to the control circuit 3702. For example, the actuator 3714 may be actuated to put the control circuit 3702 in an association mode and/or communicate association messages from the system controller 3700.

Each of the modules within the system controller 3700 may be powered by a power source 3710. The power source 3710 may include an AC power supply or DC power supply, for example. The power source 3710 may generate a supply voltage $V_{CC}$ for powering the modules within the system controller 3700.

Figure 38:
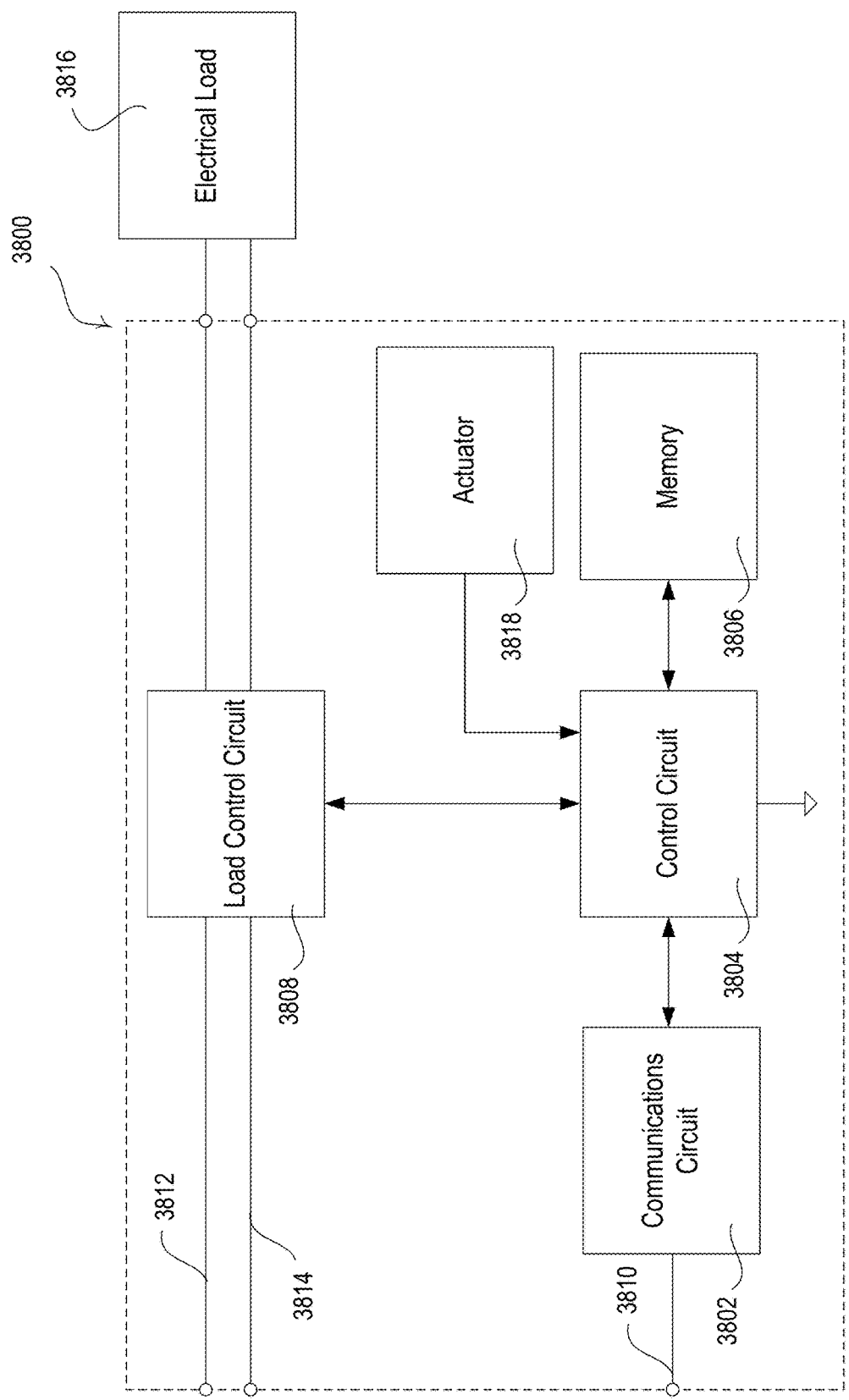
FIG. 38 is a block diagram of an example control-target device.

FIG. 38 is a block diagram illustrating an example control-target device, e.g., a load control device 3800, as described herein. The load control device 3800 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The load control device 3800 may include a communications circuit 3802. The communications circuit 3802 may include a receiver, an RF transceiver, or other communications module capable of performing wired and/or wireless communications via communications link 3810. The communications circuit 3802 may be in communication with control circuit 3804. The control circuit 3804 may include one or more general purpose processors, special purpose processors, conventional processors, digital signal processors (DSPs), microprocessors, integrated circuits, a programmable logic device (PLD), application specific integrated circuits (ASICs), or the like. The control circuit 3804 may perform signal coding, data processing, power control, input/output processing, or any other functionality that enables the load control device 3800 to perform as described herein.

The control circuit 3804 may store information in and/or retrieve information from the memory 3806. For example, the memory 3806 may maintain a registry of associated control devices and/or control configuration instructions. The memory 3806 may include a non-removable memory and/or a removable memory. The load control circuit 3808 may receive instructions from the control circuit 3804 and may control the electrical load 3816 based on the received instructions. The load control circuit 3808 may send status feedback to the control circuit 3804 regarding the status of the electrical load 3816. The load control circuit 3808 may receive power via the hot connection 3812 and the neutral connection 3814 and may provide an amount of power to the electrical load 3816. The electrical load 3816 may include any type of electrical load.

The control circuit 3804 may be in communication with an actuator 3818 (e.g., one or more buttons) that may be actuated by a user to communicate user selections to the control circuit 3804. For example, the actuator 3818 may be actuated to put the control circuit 3804 in an association mode and/or communicate association messages from the load control device 3800.

Figure 39:
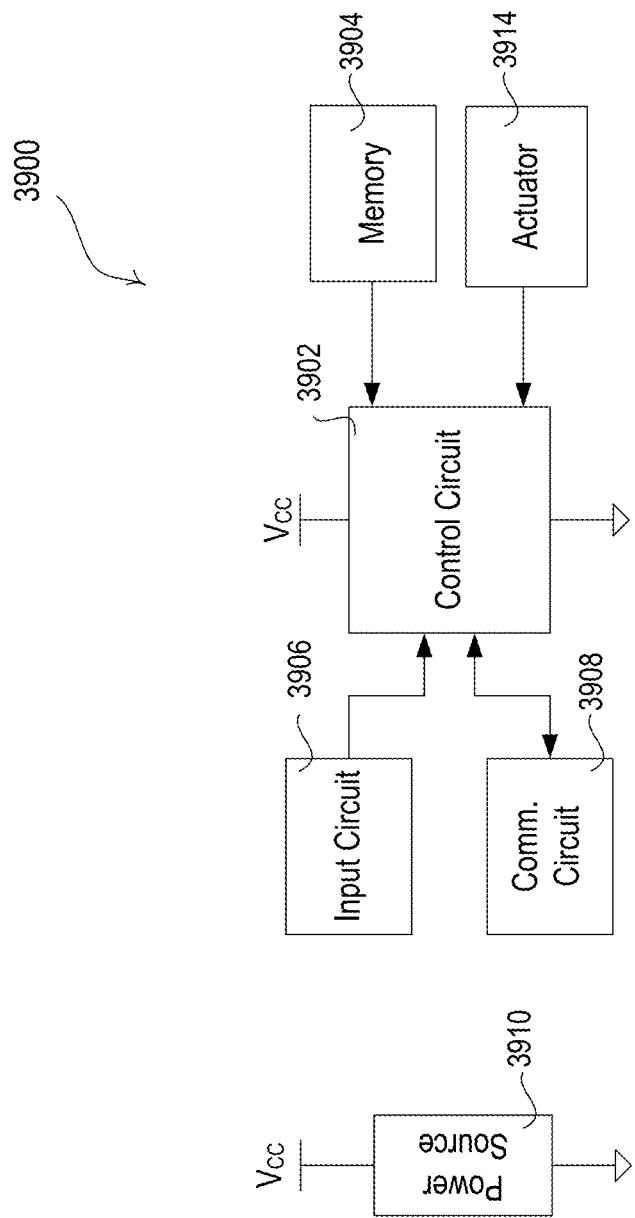
FIG. 39 is a block diagram of an example control-source device.

FIG. 39 is a block diagram illustrating an example control-source device 3900 as described herein. The control-source device 3900 may be a remote control device, an occupancy sensor, a daylight sensor, a window sensor, a temperature sensor, and/or the like. The control-source device 3900 may include a control circuit 3902 for controlling the functionality of the control-source device 3900. The control circuit 3902 may include one or more general purpose processors, special purpose processors, conventional processors, digital signal processors (DSPs), microprocessors, integrated circuits, a programmable logic device (PLD), application specific integrated circuits (ASICs), or the like. The control circuit 3902 may perform signal coding, data processing, power control, input/output processing, or any other functionality that enables the control-source device 3900 to perform as described herein.

The control circuit 3902 may be in communication with an actuator 3914 (e.g., one or more buttons) that may be actuated by a user to communicate user selections to the control circuit 3902. For example, the actuator 3914 may be actuated to put the control circuit 3902 in an association mode and/or communicate association messages from the control-source device 3900. The control circuit 3902 may store information in and/or retrieve information from the memory 3904. The memory 3904 may include a non-removable memory and/or a removable memory, as described herein.

The control-source device 3900 may include a communications circuit 3908 for transmitting and/or receiving information. The communications circuit 3908 may transmit and/or receive information via wired and/or wireless communications. The communications circuit 3908 may include a transmitter, an RF transceiver, or other circuit capable of performing wired and/or wireless communications. The communications circuit 3908 may be in communication with control circuit 3902 for transmitting and/or receiving information.

The control circuit 3902 may also be in communication with an input circuit 3906. The input circuit 3906 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the control-source device may receive input from the input circuit 3906 to put the control circuit 3902 in an association mode and/or communicate association messages from the control-source device. The control circuit 3902 may receive information from the input circuit 3906 (e.g. an indication that a button has been actuated or sensed information). Each of the modules within the control-source device 3900 may be powered by a power source 3910.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed:

1. A method of configuring a load control system using a graphical user interface software, the method comprising:
displaying a first icon representing a first electrical device;
displaying a second icon representing a second electrical device;
displaying a line from a selected one of the first or second icons to a cursor;
adjusting the line to extend from the selected one of the first or second icons to the cursor as the cursor moves;
receiving a selection of the other one of the first or second icons;
defining a relationship between the first electrical device and the second electrical device in response to the selection of the other one of the first or second icons, wherein the relationship comprises a connection between the first electrical device and the second electrical device;
after the selection of the other one of the first or second icons, ceasing display of the line extending from the selected one of the first or second icons to the cursor such that no line extends between the first and second icons;
displaying on each of the first and second icons an identical notation, wherein the identical notation indicates the connection between the first electrical device and the second electrical device; and
storing the relationship between the first electrical device and the second electrical device.

2. The method of claim 1, further comprising:
displaying a third icon representing a third electrical device;
displaying a fourth icon representing a fourth electrical device; and
defining a relationship between the third electrical device and the fourth electrical device and fixing a line between the third and fourth icons in response to a selection of the third and fourth icons, wherein the line between the third and fourth icons represents a connection between the third electrical device and the fourth electrical device.

3. The method of claim 2, further comprising:
displaying a window to allow for a selection of an option defining the connection between the third and fourth electrical devices after fixing the line between the third and fourth icons.

4. The method of claim 3, further comprising:
ceasing display of the line extending between the third and fourth icons after selection of the option such that no line extends between the third and fourth icons; and
displaying on each of the third and fourth icons an identical notation after ceasing display of the line extending between the third and fourth icons after selection of the option.

5. The method of claim 2, wherein a line type of the line between the third and fourth icons represents a type of connection between the third electrical device and the fourth electrical device.

6. The method of claim 2, wherein defining the relationship between the third electrical device and the fourth electrical device further comprises defining a power wiring connection between the third electrical device and the fourth electrical device.

7. The method of claim 5, wherein the type of connection comprises at least one of a wired communication link or a wireless communication link.

8. The method of claim 2, wherein defining the relationship between the third electrical device and the fourth electrical device further comprises associating the third electrical device with the fourth electrical device.

9. The method of claim 2, further comprising:
changing a color of the line between the third and fourth icons after the line is fixed between the third and fourth icons.

10. The method of claim 2, wherein defining the relationship between the third electrical device and the fourth electrical device further comprises defining the relationship between the third electrical device and the fourth electrical device in response to a selection of the one of a plurality of outputs of one of the third electrical device or the fourth electrical device.

11. The method of claim 1, further comprising:
displaying a plurality of icons representing a plurality of electrical devices; and
displaying lines from a plurality of selected icons to the cursor.

12. The method of claim 11, further comprising:
defining a relationship between the plurality of electrical devices and a single electrical device in response to a selection of an icon representing the single electrical device.

13. The method of claim 11, further comprising:
displaying an error window in response to a selection of a single electrical device after the selection of an icon representing the single electrical device when a number of the plurality of selected icons exceeds a threshold associated with the single electrical device.

14. The method of claim 1, further comprising:
determining if the first electrical device and the second electrical device are compatible prior to defining the relationship between the first electrical device and the second electrical device;
wherein defining the relationship between the first electrical device and the second electrical device further comprises defining the relationship between the first electrical device and the second electrical device when the first electrical device and the second electrical device are compatible.

15. The method of claim 14, further comprising:
determining if a third electrical device and a fourth electrical device are compatible; and
displaying an error message when the third electrical device and the fourth electrical device are incompatible.

16. The method of claim 1, wherein one of the first electrical device or the second electrical device is a control-source device and the other of the first electrical device or the second electrical devices is a control-target device.

17. The method of claim 1, wherein one of the first electrical device or the second electrical device is a load control device and the other of the first electrical device or the second electrical device is a control-target device.

18. The method of claim 1, further comprising receiving control instructions from the first electrical device and sending the control instructions to the second electrical device for performing control.

19. The method of claim 1, wherein the connection between the first electrical device and the second electrical device comprises an electrical connection and an association between the first electrical device and the second electrical device.

20. The method of claim 1, further comprising:
displaying an occupancy sensor icon representing an occupancy sensor;
displaying a representation of a first occupancy sensor range of the occupancy sensor; and
displaying a representation of a second occupancy sensor range of the occupancy sensor, wherein the representation of the first occupancy sensor range represents a minor motion occupancy sensor range in which minor motions of an occupant are detectable and the representation of the second occupancy sensor range represents a major motion occupancy sensor range in which major motions of the occupant are detectable.

21. The method of claim 20, wherein the representation of the second occupancy sensor range is larger than the representation of the first occupancy sensor range and encompasses the representation of the first occupancy sensor range.

22. The method of claim 20, wherein the representation of the first occupancy sensor range and the representation of the second occupancy sensor range are different colors or shades of color.

23. The method of claim 20, wherein the occupancy sensor is a wall-mounted dual-tech occupancy sensor.

24. The method of claim 20, wherein at least one of the first occupancy sensor range or the second occupancy sensor range comprise ultrasonic occupancy sensor ranges.

* * * * *